US008724644B2

(12) United States Patent
Okabe et al.

(10) Patent No.: US 8,724,644 B2
(45) Date of Patent: May 13, 2014

(54) DOUBLE-RING NETWORK SYSTEM, METHOD FOR DETERMINING TRANSMISSION PRIORITY IN DOUBLE-RING NETWORK AND TRANSMISSION STATION DEVICE

(75) Inventors: Motohiko Okabe, Fuchu (JP); Shinya Kohno, Hachioji (JP); Koji Shibata, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 13/336,142

(22) Filed: Dec. 23, 2011

(65) Prior Publication Data

US 2012/0163239 A1  Jun. 28, 2012

(30) Foreign Application Priority Data

Dec. 28, 2010  (JP) .................................. 2010-293159

(51) Int. Cl.
*H04L 12/28* (2006.01)
(52) U.S. Cl.
USPC ........................... 370/406; 370/403; 370/424
(58) Field of Classification Search
USPC ...................... 370/257, 258, 397, 395.3, 399, 370/403–406, 423–424
See application file for complete search history.

(56) References Cited

U.S. PATENT DOCUMENTS

| | | | | |
|---|---|---|---|---|
| 5,469,438 | A * | 11/1995 | Baumert et al. | 370/432 |
| 8,169,895 | B2 | 5/2012 | Takase et al. | |
| 2003/0177267 | A1 * | 9/2003 | Orava et al. | 709/245 |
| 2003/0206527 | A1 * | 11/2003 | Yim | 370/238 |
| 2004/0057375 | A1 * | 3/2004 | Shiragaki et al. | 370/216 |
| 2005/0005024 | A1 * | 1/2005 | Samuels et al. | 709/238 |
| 2006/0013584 | A1 * | 1/2006 | Miyazaki | 398/19 |
| 2007/0091829 | A1 * | 4/2007 | Ge et al. | 370/257 |
| 2008/0118244 | A1 | 5/2008 | Nakada | |
| 2008/0205303 | A1 * | 8/2008 | Izumi | 370/258 |
| 2009/0080447 | A1 * | 3/2009 | Sawada et al. | 370/401 |
| 2010/0067408 | A1 * | 3/2010 | Kono et al. | 370/276 |

FOREIGN PATENT DOCUMENTS

| | | |
|---|---|---|
| CN | 101056184 A | 10/2007 |
| CN | 101188539 A | 5/2008 |
| JP | 2000-316017 A | 11/2000 |
| JP | 2004-166074 A | 6/2004 |
| JP | 2008-131132 A | 6/2008 |
| JP | 4628467 B2 | 2/2011 |

OTHER PUBLICATIONS

Chinese Office Action dated Dec. 17, 2013 (and English translation thereof) in counterpart Chinese Application No. 201110446954.1.

* cited by examiner

*Primary Examiner* — Gary Mui
*Assistant Examiner* — Kabir Jahangir
(74) *Attorney, Agent, or Firm* — Holtz, Holtz, Goodman & Chick, PC

(57) ABSTRACT

According to one embodiment, in a double-ring network, a master station includes a transmitting and receiving permission switch portion, a communication port A at an A-system side, a communication port B at a B-system side, a first receiving control circuit portion, a transmitting and receiving control circuit portion, a frame detection determining circuit portion, a frame data generating circuit portion, a logical address determining circuit portion, a live list setting circuit portion and an address list setting circuit portion. The master station determines a token order (a transmission priority, also called a logical address) using a shortest path function by the logical address determining circuit portion and the address list setting circuit portion such that the token order does not depend on physical addresses of transmission stations and is matched to a connection order of transmission stations to realize path optimization. This reduces a transmission time.

8 Claims, 27 Drawing Sheets

FIG. 2
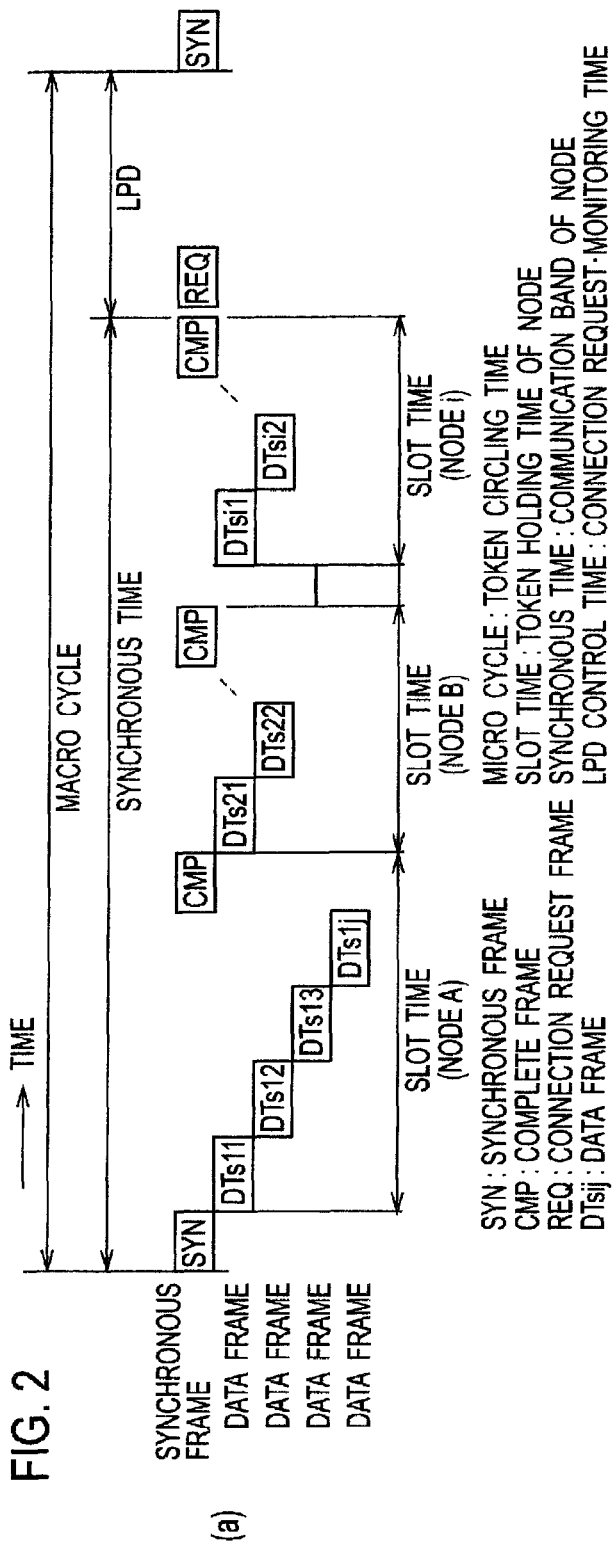
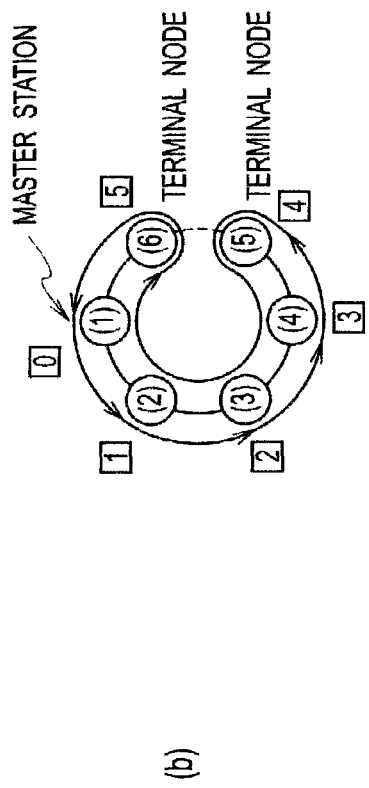

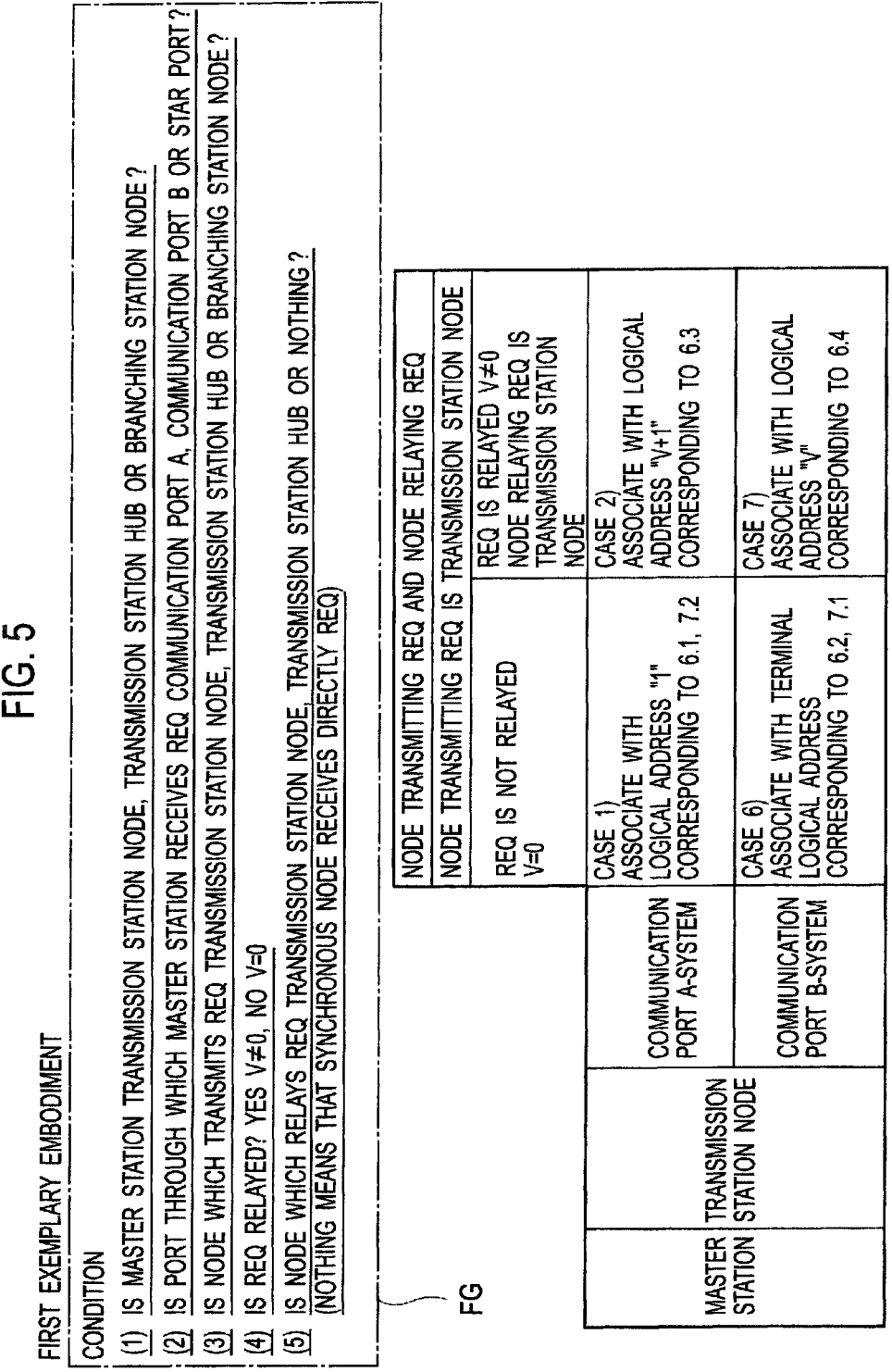

FIG. 6A

SECOND EXEMPLARY EMBODIMENT

CONDITION
(1) IS MASTER STATION TRANSMISSION STATION NODE, TRANSMISSION STATION HUB OR BRANCHING STATION NODE?
(2) IS PORT THROUGH WHICH MASTER STATION RECEIVES REQ COMMUNICATION PORT A, COMMUNICATION PORT B OR STAR PORT?
(3) IS NODE WHICH TRANSMITS REQ TRANSMISSION STATION NODE, TRANSMISSION STATION HUB OR BRANCHING STATION NODE?
(4) IS REQ RELAYED? YES V≠0, NO V=0
(5) IS NODE WHICH RELAYS REQ TRANSMISSION STATION NODE, TRANSMISSION STATION HUB OR NOTHING? (NOTHING MEANS THAT SYNCHRONOUS NODE RECEIVES DIRECTLY REQ)

| MASTER STATION | TRANSMISSION STATION NODE | | NODE TRANSMITTING REQ AND NODE RELAYING REQ | | | | | | |
|---|---|---|---|---|---|---|---|---|---|
| | | FG | NODE TRANSMITTING REQ IS TRANSMISSION STATION NODE | | | NODE TRANSMITTING REQ IS TRANSMISSION STATION HUB | | | NODE TRANSMITTING REQ IS BRANCHING STATION NODE | |
| | | | REQ IS NOT RELAYED V=0 | REQ IS RELAYED V≠0 NODE RELAYING REQ IS TRANSMISSION STATION NODE | REQ IS RELAYED V≠0 NODE RELAYING REQ IS BRANCHING STATION NODE | REQ IS NOT RELAYED V=0 | REQ IS RELAYED V≠0 NODE RELAYING REQ IS TRANSMISSION STATION NODE | REQ IS RELAYED V≠0 NODE RELAYING REQ IS BRANCHING STATION NODE | REQ IS NOT RELAYED V=0 | REQ IS RELAYED V≠0 NODE RELAYING REQ IS TRANSMISSION STATION NODE | REQ IS RELAYED V≠0 NODE RELAYING REQ IS BRANCHING STATION NODE |
| | COMMUNICATION PORT A-SYSTEM | | CASE 1) ASSOCIATE WITH LOGICAL ADDRESS "i" CORRESPONDING TO 6.1, 7.2 | CASE 2) ASSOCIATE WITH LOGICAL ADDRESS "V+1" CORRESPONDING TO 6.3 | CASE 3) ASSOCIATE WITH LOGICAL ADDRESS "JA+1" CORRESPONDING TO 7.6 | CASE 1) ASSOCIATE WITH LOGICAL ADDRESS "i" | CASE 2) ASSOCIATE WITH LOGICAL ADDRESS "V+1" CORRESPONDING TO 7.3 | CASE 3) ASSOCIATE WITH LOGICAL ADDRESS "JA+1" | CASE 4) ASSOCIATE WITH LOGICAL ADDRESS "V+1" | CASE 5) ASSOCIATE WITH LOGICAL ADDRESS "V+1" CORRESPONDING TO 7.5, 7.7 |
| | COMMUNICATION PORT B-SYSTEM | | CASE 6) ASSOCIATE WITH TERMINAL LOGICAL ADDRESS CORRESPONDING TO 6.2, 7.1 | CASE 7) ASSOCIATE WITH LOGICAL ADDRESS "V" CORRESPONDING TO 6.4 | CASE 7) ASSOCIATE WITH LOGICAL ADDRESS "V" CORRESPONDING TO 7.8 | CASE 6) ASSOCIATE WITH TERMINAL LOGICAL ADDRESS | CASE 7) ASSOCIATE WITH LOGICAL ADDRESS "V" CORRESPONDING TO 7.4 | CASE 7) ASSOCIATE WITH LOGICAL ADDRESS "V" | CASE 8) ASSOCIATE WITH LOGICAL ADDRESS "V" | CASE 9) ASSOCIATE WITH LOGICAL ADDRESS "V+1" CORRESPONDING TO 7.9, 7.10 |
| | STAR PORT | | — | — | — | — | — | — | — | — |

TO FIG. 6B

FIG. 6B (FROM FIG. 6A)

| | TRANSMISSION STATION HUB | | | JTG1 | | |
|---|---|---|---|---|---|---|
| | A-SYSTEM REQ | B-SYSTEM REQ | STAR REQ | A-SYSTEM REQ | B-SYSTEM REQ | STAR REQ |
| | CASE 1) ASSOCIATE WITH LOGICAL ADDRESS "1" | CASE 6) ASSOCIATE WITH TERMINAL LOGICAL ADDRESS | – | – | – | – |
| | CASE 2) ASSOCIATE WITH LOGICAL ADDRESS "V+1" | CASE 7) ASSOCIATE WITH LOGICAL ADDRESS "V" | – | – | – | – |
| | CASE 3) ASSOCIATE WITH LOGICAL ADDRESS "JA+1" | CASE 7) ASSOCIATE WITH LOGICAL ADDRESS "V" | – | – | – | – |
| | – | – | – | – | – | – |
| | CASE 1) ASSOCIATE WITH LOGICAL ADDRESS "1" | CASE 6) ASSOCIATE WITH TERMINAL LOGICAL ADDRESS | – | – | – | – |
| | CASE 2) ASSOCIATE WITH LOGICAL ADDRESS "V+1" | CASE 7) ASSOCIATE WITH LOGICAL ADDRESS "V" | – | – | – | – |
| | CASE 3) ASSOCIATE WITH LOGICAL ADDRESS "JA+1" | CASE 7) ASSOCIATE WITH LOGICAL ADDRESS "V" | – | – | – | – |
| | – | – | – | – | – | – |
| | – | – | CASE 4) ASSOCIATE WITH LOGICAL ADDRESS "1" | – | – | – |
| | CASE 5) ASSOCIATE WITH LOGICAL ADDRESS "V+1" | CASE 8) ASSOCIATE WITH LOGICAL ADDRESS "V" | – | – | – | – |
| | CASE 5) ASSOCIATE WITH LOGICAL ADDRESS "JA+1" | CASE 9) ASSOCIATE WITH LOGICAL ADDRESS "V+1" | – | – | – | – |
| | – | – | – | – | – | – |

FIG. 12

FIRST PERIOD
NODE 1 TRANSMITS

| | Pre | | | LL 0··1h | AL(1) | FCS |

CMP | Pre | | N 0 | | | | FCS |
LPD | Pre | | N 0 | | | | FCS |

NODE 2 TRANSMITS
REQ | Pre | | M(2) T V 0 | | | | FCS |

NODE 5 TRANSMITS
REQ | Pre | | M(5) T V 0 | | | | FCS |

THIRD PERIOD

NODE 1 TRANSMITS

| SYNLST | Pre | - | LL 0··7h | AL (1)(2)(5) | FCS |

| CMP | Pre | N⓪ | - | FCS |

NODE 2 TRANSMITS

| REQ | Pre | M(3) T V① | - | FCS |

| CMP | Pre | N① | - | FCS |

NODE 5 TRANSMITS

| REQ | Pre | M(4) T V② | - | FCS |

| CMP | Pre | N② | - | FCS |

NODE 1 TRANSMITS

| LPD | Pre | N⓪ | - | FCS |

NODE 2 TRANSMITS

| LPD | Pre | N① | - | FCS |

NODE 5 TRANSMITS

| LPD | Pre | N② | - | FCS |

FIG. 15

FOURTH PERIOD

NODE 1 TRANSMITS
| SYNLST | Pre | — | LL 0···1Fh | AL (1),(2),(3),(4),(5) | FCS |

| | | | |
|---|---|---|---|
| CMP | Pre | — | N0 | FCS |

NODE 2 TRANSMITS
| CMP | Pre | — | N1 | FCS |

NODE 3 TRANSMITS
| CMP | Pre | — | N2 | FCS |

NODE 4 TRANSMITS
| CMP | Pre | — | N3 | FCS |

NODE 5 TRANSMITS
| CMP | Pre | — | N4 | FCS |

NODE 1 TRANSMITS
| LPD | Pre | — | N0 | FCS |

NODE 2 TRANSMITS
| LPD | Pre | — | N1 | FCS |

NODE 3 TRANSMITS
| LPD | Pre | — | N2 | FCS |

NODE 4 TRANSMITS
| LPD | Pre | — | N3 | FCS |

NODE 5 TRANSMITS
| LPD | Pre | — | N4 | FCS |

FIG. 16

FIFTH PERIOD AND REPETITION

NODE 1 TRANSMITS
| SYN | Pre | - | - | LL,0··1Fh | FCS |

| CMP | Pre | - | N0 | | FCS |

NODE 2 TRANSMITS
| CMP | Pre | - | N1 | | FCS |

NODE 3 TRANSMITS
| CMP | Pre | - | N2 | | FCS |

NODE 4 TRANSMITS
| CMP | Pre | - | N3 | | FCS |

NODE 5 TRANSMITS
| CMP | Pre | - | N4 | | FCS |

NODE 1 TRANSMITS
| LPD | Pre | - | N0 | | FCS |

NODE 2 TRANSMITS
| LPD | Pre | - | N1 | | FCS |

NODE 3 TRANSMITS
| LPD | Pre | - | N2 | | FCS |

NODE 4 TRANSMITS
| LPD | Pre | - | N3 | | FCS |

NODE 5 TRANSMITS
| LPD | Pre | - | N4 | | FCS |

FIG. 17
(a)
| 3 | 2 | 1 | 0 |
|---|---|---|---|
| 0 | 0 | 0 | 0 |
| 7 | 6 | 5 | 4 |
| 0 | 0 | 0 | 0 |
| ⋮ | ⋮ | ⋮ | ⋮ |
| 255 | 254 | | |
| 0 | 0 | 0 | 0 |
(b) (6.0 : CASE 0)
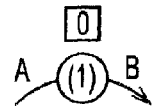
(c) (6.0 : CASE 0)
| 3 | 2 | 1 | 0 | — LOGICAL ADDRESS |
|---|---|---|---|---|
| 0 | 0 | 0 | (1) | — PHYSICAL ADDRESS |
⋮
(d) 6.0 (6.0 : CASE 0)
| LL 31 | | | 0 |
|---|---|---|---|
| 00h | 00h | 00h | 02h |
| 00h | 00h | 00h | 00h |
| 00h | 00h | 00h | 00h |
| ‥ | ‥ | ‥ | ‥ |
| 00h | 00h | 00h | 00h |
⋮
6.0 (6.0 : CASE 0)
| AL 3 | 2 | 1 | 0 |
|---|---|---|---|
| 0 | 0 | 0 | (1) |
| 0 | 0 | 0 | 0 |
| 0 | 0 | 0 | 0 |
| ‥ | ‥ | ‥ | ‥ |
| 0 | 0 | 0 | 0 |
(LOGICAL ADDRESSES ARE OMITTED IN SECOND OR MORE ROWS)
(e) 6.1 (NODE - COMMUNICATION PORT A - CASE 1)
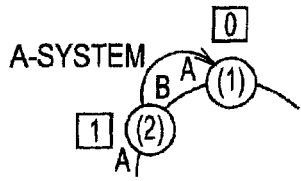
A-SYSTEM
(f) 6.1 (NODE - COMMUNICATION PORT A - CASE 1)
| 3 | 2 | 1 | 0 |
|---|---|---|---|
| 0 | 0 | (2) | (1) |

FIG. 18
(a) 6.2 (NODE - COMMUNICATION PORT B - CASE 6)
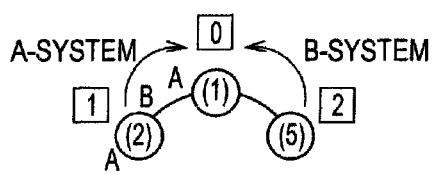
(b) 6.2 (NODE - COMMUNICATION PORT B - CASE 6)
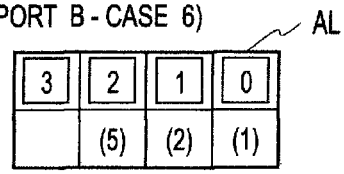
(c) 6.3 (NODE - COMMUNICATION PORT A - CASE 2)
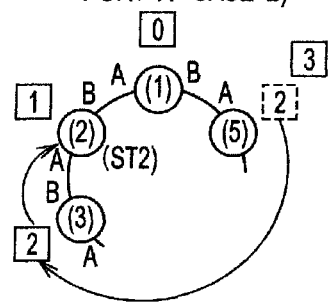
(d) 6.3 (NODE - COMMUNICATION PORT A - CASE 2)
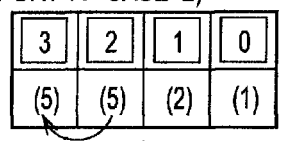
(e)
(f) 6.4 (NODE - COMMUNICATION PORT B - CASE 7)
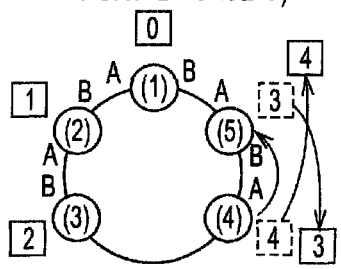
(g) 6.4
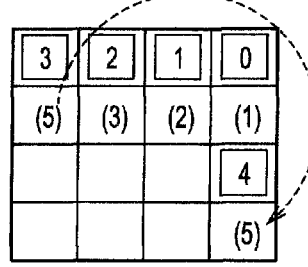
(h) 6.4
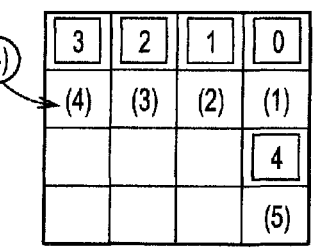

FIG. 20
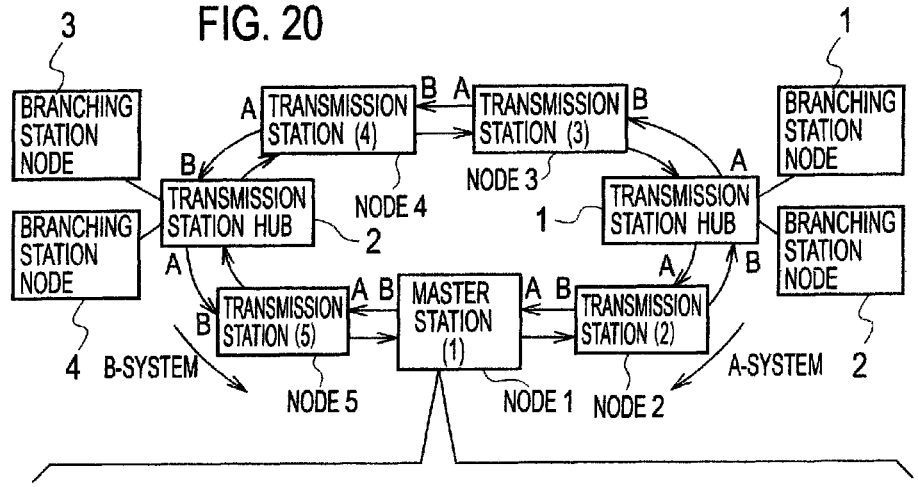
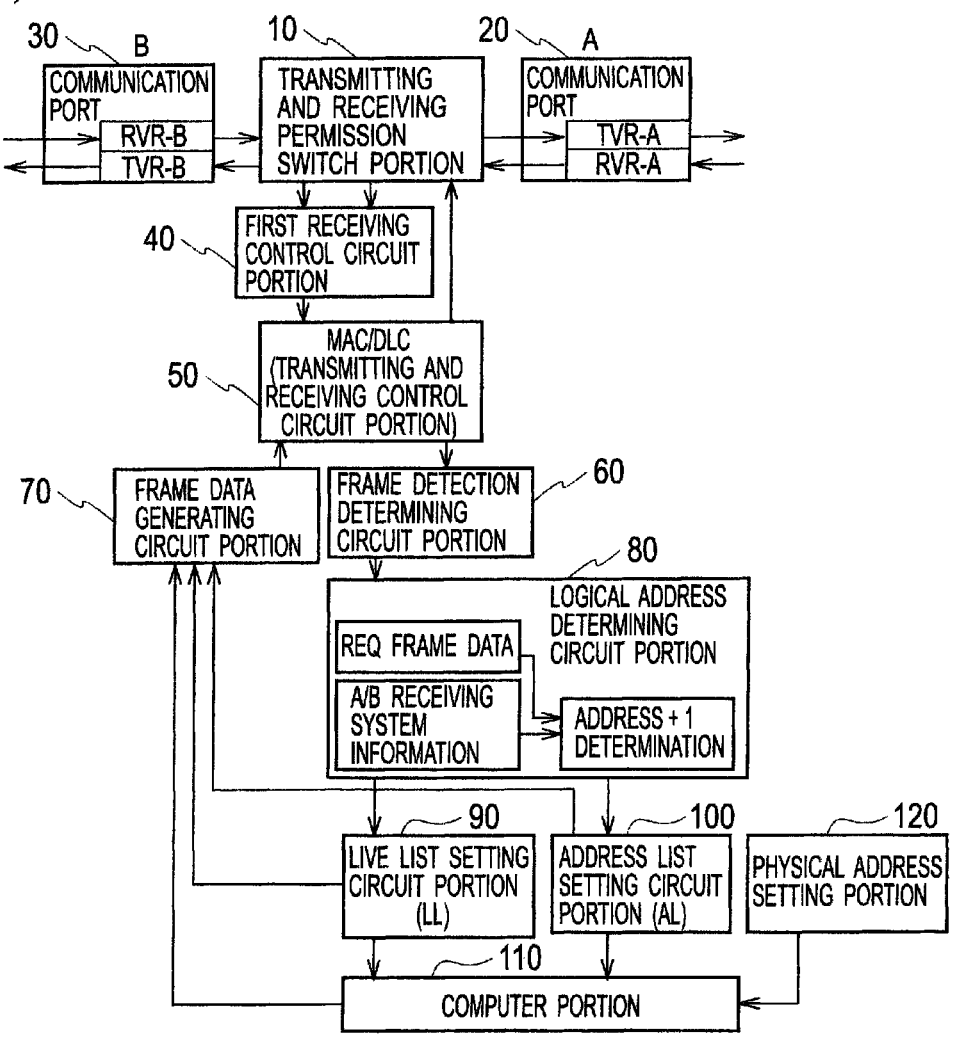

FIG. 22
(a) 7.1 (NODE - COMMUNICATION PORT B - CASE 6)
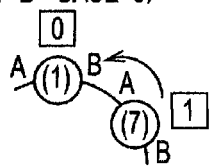
(b) 7.1 (NODE - COMMUNICATION PORT B - CASE 6)
| AL | | | |
|---|---|---|---|
| 3 | 2 | 1 | 0 |
| 0 | 0 | (7) | (1) |
| 0 | 0 | 0 | 0 |
| .. | .. | .. | .. |
| 0 | 0 | 0 | 0 |
(c) 7.2 (NODE - COMMUNICATION PORT A - CASE 1)
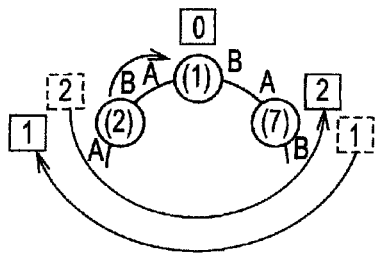
(d) 7.2 (NODE - COMMUNICATION PORT A - CASE 1)
| AL | | | |
|---|---|---|---|
| 3 | 2 | 1 | 0 |
| 0 | (7) | (2) | (1) |
| 0 | 0 | 0 | 0 |
| .. | .. | .. | .. |
| 0 | 0 | 0 | 0 |
(e) 7.3 (NODE - COMMUNICATION PORT A - HUB - CASE 2)
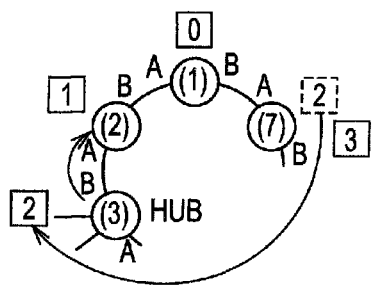
(f) 7.3 (NODE - COMMUNICATION PORT A - HUB - CASE 2)
| AL | | | |
|---|---|---|---|
| 3 | 2 | 1 | 0 |
| (7) | (3) | (2) | (1) |
| 0 | 0 | 0 | 0 |
| .. | .. | .. | .. |
| 0 | 0 | 0 | 0 |
(g) 7.4 (NODE - COMMUNICATION PORT B - HUB - CASE 7)
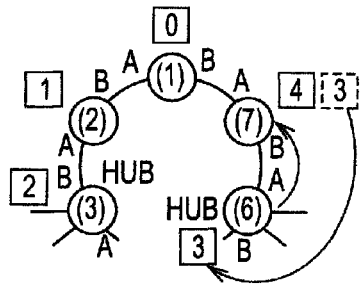
(h) 7.4 (NODE - COMMUNICATION PORT B - HUB - CASE 7)
| AL | | | |
|---|---|---|---|
| 3 | 2 | 1 | 0 |
| (6) | (3) | (2) | (1) |
| 0 | 0 | 0 | (7) |
| 0 | 0 | 0 | (4) |
| .. | .. | .. | .. |
| 0 | 0 | 0 | 0 |

FIG. 23
(a) 7.5 (NODE - COMMUNICATION PORT A - BRANCHING STATION - CASE 5)
(b) 7.5 (NODE - COMMUNICATION PORT A - BRANCHING STATION - CASE 5)
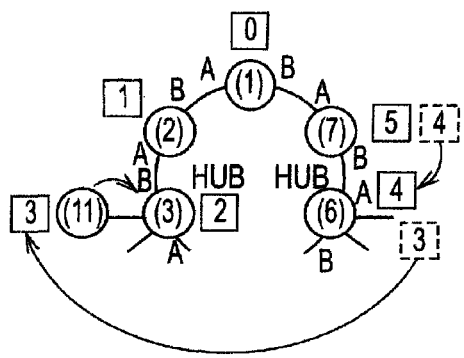
(c) 7.6 (NODE - COMMUNICATION PORT A - HUB - THERE IS RELAY - CASE 3)
(d)
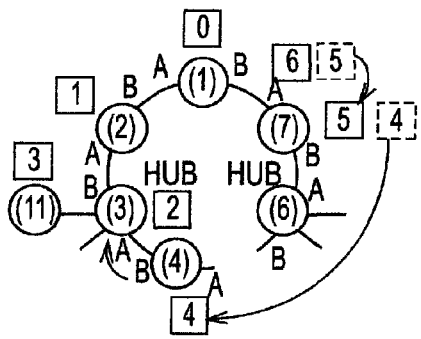
(e) 7.7 (NODE - COMMUNICATION PORT A - BRANCHING STATION - THERE IS RELAY - CASE 5)
(f)
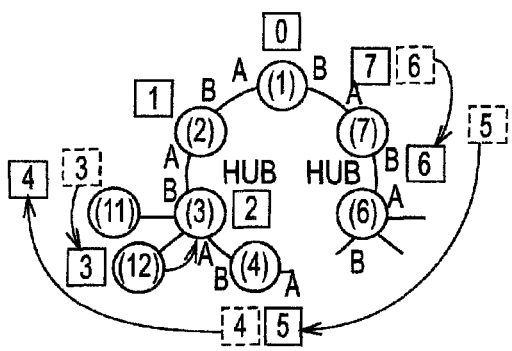

FIG. 24
(a) 7.8 (NODE - COMMUNICATION PORT B - HUB - THERE IS RELAY - CASE 7)
(b)
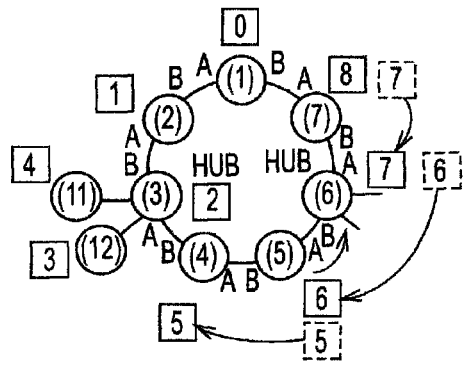
(c) 7.9 (NODE - COMMUNICATION PORT B - BRANCHING STATION - THERE IS RELAY - CASE 9)
(d)
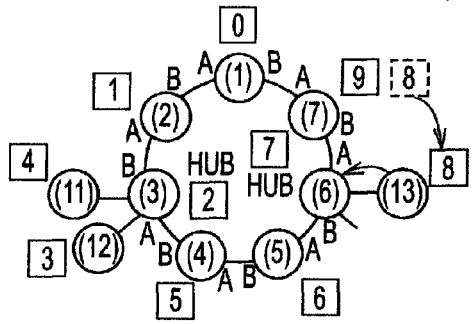
(e) 7.10 (NODE - COMMUNICATION PORT B - BRANCHING STATION - THERE IS RELAY - CASE 9)
(f)
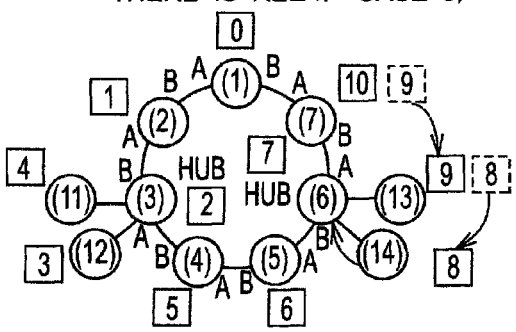

(a) EXAMPLE 2 OF ENTERED STRUCTURE (INCLUDING HUB)

(b)

| LL | | | |
|---|---|---|---|
| 31 | | | 0 |
| 00 | 00 | 0E | FF |
| 00 | 00 | 00 | 00 |
| .. | .. | .. | .. |
| 00 | 00 | 00 | 00 |

(c)

AL

| 3 | 2 | 1 | 0 |
|---|---|---|---|
| (12) | (3) | (2) | (1) |
| 7 | 6 | 5 | 4 |
| (6) | (5) | (4) | (11) |
|  | 10 | 9 | 8 |
| 0 | (7) | (13) | (14) |

FIG. 26
EXAMPLE OF WITHDRAWN STRUCTURE
(a) 8.1
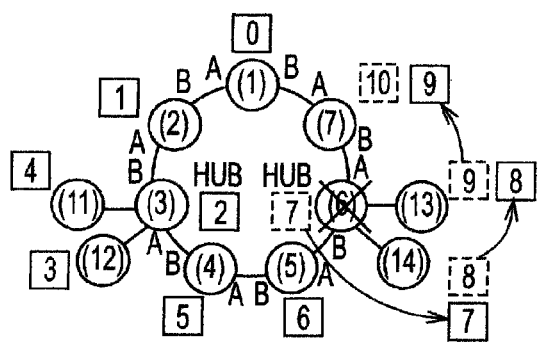
(b)
(c) 8.2
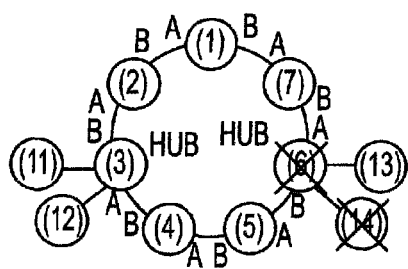
(d)
(e) 8.3
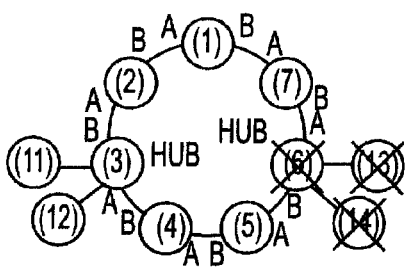
(f)

DOUBLE-RING NETWORK SYSTEM, METHOD FOR DETERMINING TRANSMISSION PRIORITY IN DOUBLE-RING NETWORK AND TRANSMISSION STATION DEVICE

CROSS REFERENCE TO RELATED APPLICATION

This application is based upon and claims the benefit of priority from Japanese Patent Application No. 2010-293159, filed on Dec. 28, 2010, the entire contents of which are incorporated herein by reference.

FIELD

Embodiments described herein relate generally to a double-ring network system, a method for determining a transmission priority in a double-ring network, and a transmission station device.

BACKGROUND

There is a token-ring method (hereinafter simply called "token-ring") for transmitting or receiving data between nodes (transmission stations) connected to a transmission line such as a LAN (local area network). Generally, in token-ring, a token is defined and constantly circles in a transmission line. This prevents frames from colliding each other on the transmission line. Namely, the token-ring differs from CSMA/CD method and can avoid the collision.

For example, Patent document 1 (Japanese Published Unexamined Patent Application No. 2004-166074) discloses a data transmission method in which a transmission station eligible to transmit a frame is controlled by a token, one transmission station is set as a synchronous node from among transmission stations, and a synchronous frame (SYN frame) including information as to whether or not a transmission station is active, which is transmitted by the synchronous node, is used.

Patent document 2 (Japanese Published Unexamined Patent Application No. 2008-131132) discloses a data transmission method in token-ring in which the token-ring has a ring topology where two or more transmission stations each of which has two communication ports allowing two-way communication are connected in a ring shape, any adjacent two transmission stations are set to be terminal stations, any transmission station is set to be a synchronous node, and transmission is controlled while a frame transmitted beyond the terminal station is set to be invalid.

These data transmission methods described in Patent documents 1 and 2 avoid frame collision by limiting to one the number of transmission stations (nodes) eligible to transmit a frame on a transmission line using a token for the predetermined duration. For example, a transmission station starts transmission to a master station in order of increasing a node number which is set as a token order. Thus, the length of time of transmission to the master station largely varies depending on the assignment of node number in the token-ring network system.

For example, there is a problem that a transmission time necessary for a synchronous time by a synchronous frame largely varies between a case where transmission stations are connected in a ring shape whose node numbers are assigned in order of transmission priority previously set and a case where transmission stations are connected in a ring shape whose node numbers are not assigned in order of transmission priority previously set. The latter case brings delayed accumulation between transmission stations, which causes delay of transmission time.

In the token-ring network system, there is a possibility that a transmission station is changed or added. In this case, it is necessary to create a loss-free network system where an operator determines a transmission priority of the transmission station and connects the transmission station on the transmission line in view of the transmission priority such that delay of transmission time does not occur. However, the operator is burdened with the creation of network system in view of a transmission priority.

Patent documents 1 and 2 disclose the methods in which the master station accepts an REQ frame from only a node which is allowed to transmit it by the master station, during MAC control time. Thus, in a case where 256 transmission stations (including a master station) enter into the transmission line, the master station needs to perform 256 scans using SYN frames. This requires a great deal of time until all transmission stations are allowed to transmit an REQ frame to the master station.

BRIEF DESCRIPTION OF THE DRAWINGS

FIG. 2 is an explanatory diagram that illustrates a transmission priority according to the first exemplary embodiment.

FIG. 5 is an explanatory diagram that illustrates determination processing of the logical address determining circuit portion according to the first exemplary embodiment.

FIG. 6A is an explanatory diagram that illustrates determination processing of the logical address determining circuit portion according to a second exemplary embodiment.

FIG. 6B is an explanatory diagram that illustrates the determination processing of the logical address determining circuit portion according to a second exemplary embodiment.

FIG. 12 is an explanatory diagram that illustrates frames in a first period according to the first exemplary embodiment.

Figure 13:
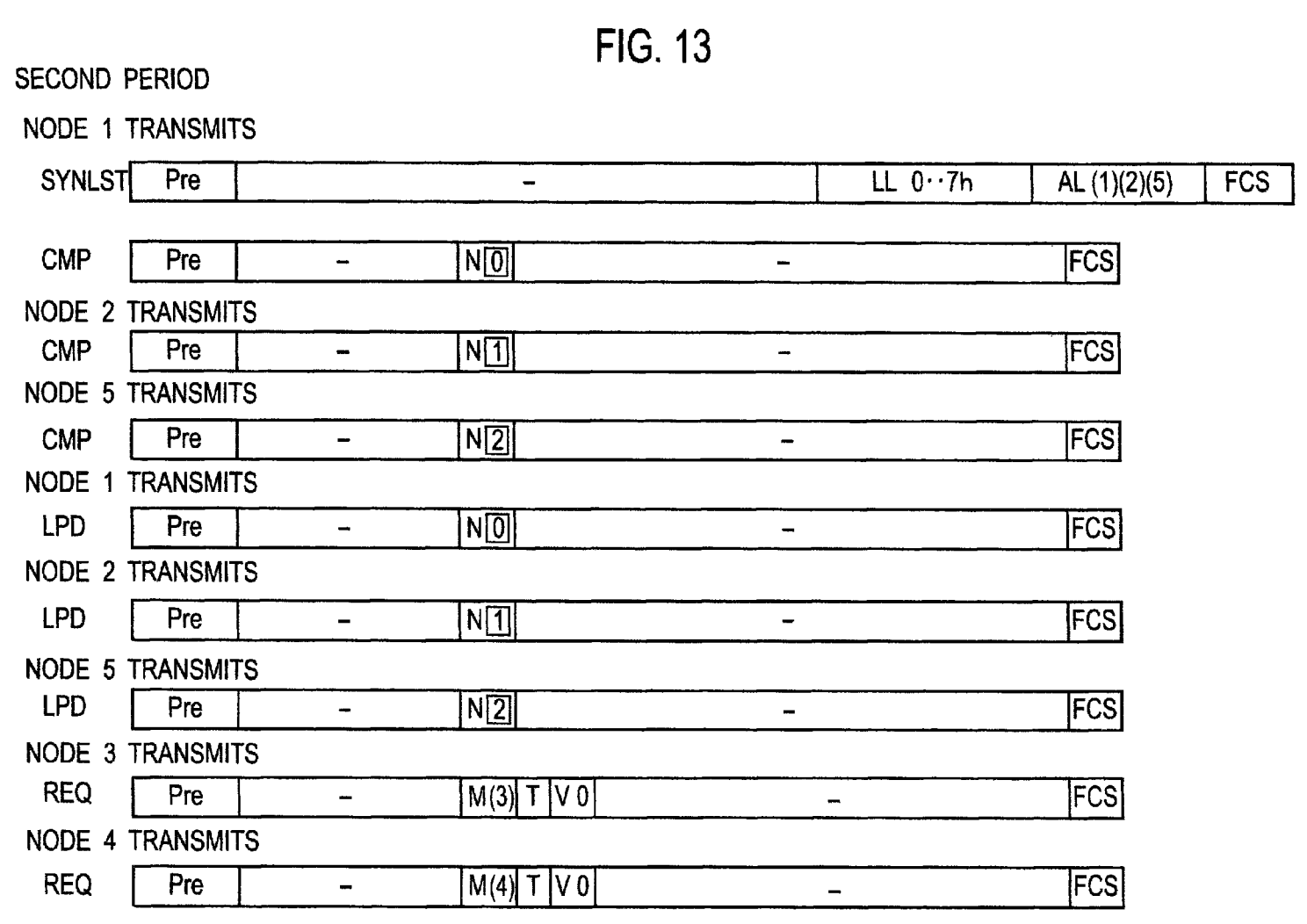

FIG. 13 is an explanatory diagram that illustrates frames in a second period according to the first exemplary embodiment.

FIG. 14 is an explanatory diagram that illustrates frames in a third period according to the first exemplary embodiment.

FIG. 15 is an explanatory diagram that illustrates frames in a fourth period according to the first exemplary embodiment.

FIG. 16 is an explanatory diagram that illustrates frames in a fifth period according to the first exemplary embodiment.

FIG. 17 is an explanatory diagram that illustrates an address list generated when a transmission station enters into a loop according to the first exemplary embodiment.

FIG. 18 is an explanatory diagram that illustrates an address list generated when a transmission station enters into the loop according to the first exemplary embodiment.

FIG. 20 is a schematic structure diagram in a control method of a double-ring network according to the second exemplary embodiment.

FIG. 22 is an explanatory diagram that illustrates an address list generated when a hub enters into the loop according to the second exemplary embodiment.

FIG. 23 is an explanatory diagram that illustrates an address list generated when a hub enters into the loop according to the second exemplary embodiment.

FIG. 24 is an explanatory diagram that illustrates an address list generated when a hub enters into the loop according to the second exemplary embodiment.

FIG. 26 is an explanatory diagram that illustrates an address list generated when a hub withdraws from the loop according to the second exemplary embodiment.

DETAILED DESCRIPTION

Figure 1:
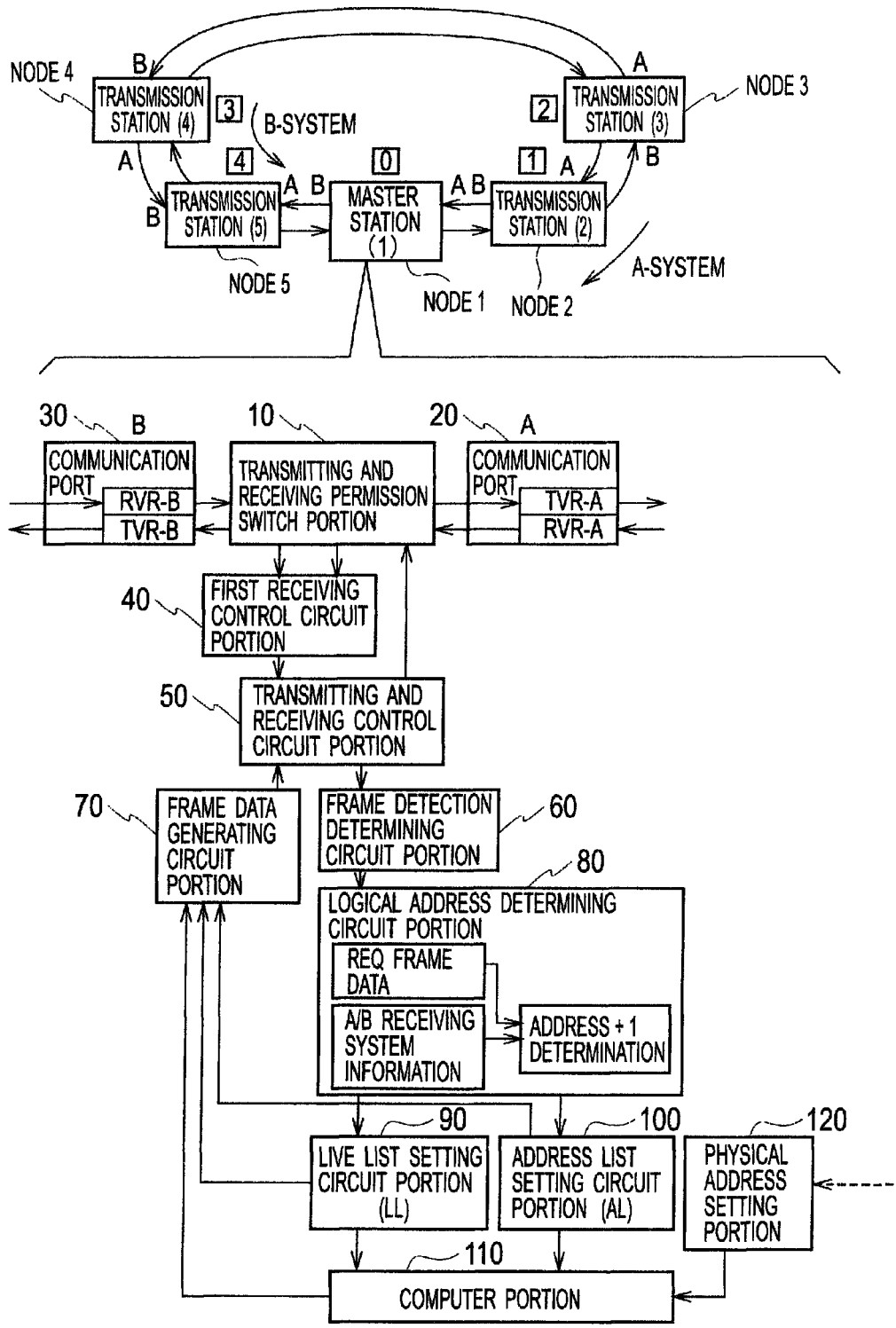
FIG. 1 is a schematic structure diagram in a control method of a double-ring network according to a first exemplary embodiment.

According to one embodiment, a double-ring network system includes one or more transmission stations each of which is connected to a double-ring network and includes two communication ports allowing two-way communication. Any one of the one or more transmission stations functions as a master station. A new transmission station, which enters into the double-ring network, transmits a connection request frame including a physical address of the new transmission station, according to a reception of a synchronous frame from the master station. The master station associates the transmitted physical address with a logical address for determining a transmission priority of each transmission station connected to the double-ring network, to determine a transmission priority of the new transmission station. The master station includes: a transmitting and receiving portion that controls a transmission and reception timing, transmits a generated frame from the two communication ports, and introduces therein a frame received via the double-ring network according to a transmission of a synchronous frame; a frame detection determining circuit portion that determines whether or not the transmitting and receiving portion receives the connection request frame; an address list setting circuit portion that includes transmission priority setting circuits to which logical addresses are sequentially assigned, and transmits a physical address of a transmission station set in each transmission priority setting circuit and a logical address of the each transmission priority setting circuit in which the physical address of the transmission station is set; a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame.

According to one embodiment, a method for determining a transmission priority of a transmission station connected to a double-ring network system to which one or more transmission stations each of which is connected to the double-ring network and includes two communication ports allowing two-way communication are connected, wherein any one of the one or more transmission stations functions as a master station. The method includes: generating, via the master station, an address list in which one or more logical addresses for determining one or more transmission priorities of the one or more transmission stations connected to the double-ring network are arranged in ascending order; transmitting, via the master station, to the one or more transmission stations connected to the double-ring network a synchronous frame which includes therein the one or more logical addresses associated with one or more physical addresses of the one or more transmission stations; transmitting, via a new transmission station to be connected to the double-ring network, to the master station a connection request frame which includes a physical address of the new transmission station; setting, when each transmission station other than the master station receives the synchronous frame, a logical address included in the synchronous frame as a transmission priority of the each transmission station and transmitting, via the each transmission station, a frame data to the master station according to its own transmission priority; associating, via the master station, on the address list the physical address included in the connection request frame transmitted from the new transmission station according to a transmission of the synchronous frame, with a logical address whose a value corresponds to a connection number of the new transmission station such that transmission priorities of transmission stations match a connection order on the double-ring network; obtaining, via the master station, when receiving the connection request frame in a state where physical addresses are assigned on the address list, logical addresses generated by adding one to each of logical addresses equal to or more than the logical address associated with the physical address included in the connection request frame, and associating with the obtained logical addresses physical addresses associated with the logical addresses equal to or more than the logical address; and transmitting, via the master station, every time when a physical address is assigned on the address list, to the double-ring network the synchronous frame to which the physical address and a logical address associated with the physical address are added.

According to one embodiment, a transmission station device which is connected to a double-ring network and includes two communication ports allowing two-way communication. The transmission station device includes: a transmitting and receiving portion that controls a transmission and reception timing, transmits a generated frame from the two communication ports, and introduces therein a frame received via the double-ring network according to a transmission of a synchronous frame; a frame detection determining circuit portion that determines whether or not the transmitting and receiving portion receives a connection request frame from a new transmission station; an address list setting circuit portion that includes transmission priority setting circuits to which logical addresses indicative of transmission priorities on the double-ring network are sequentially assigned, and transmits a physical address of a transmission station set in each transmission priority setting circuit and a logical address of the each transmission priority setting circuit in which the physical address of the transmission station is set; a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame.

In first and second exemplary embodiments, transmission priorities of nodes at a synchronous time are controlled to reduce the synchronous time. In this data transmission method, frame collision is avoided by limiting to one the number of nodes eligible to transmit a frame on a transmission line for the predetermined duration. Namely, by introducing a shortest path function in the data transmission method according to the first and second embodiments, a token order is determined such that the token order does not depend on physical addresses of transmission stations and is matched to a connection order of transmission stations to realize path optimization.

The first and second embodiments will be described hereinafter with reference to the accompanying drawings. In each drawing, the same or similar symbol is assigned to the same or similar element. It is noted that each drawing shows a typical structure of device, system or the like which differs from a real structure of device, system or the like. Accordingly, a concrete structure should be determined with reference to the following description. It goes without saying that one drawing may include a different part in a structure similar to another drawing.

As the first exemplary embodiment, it will be described that transmission station nodes "i", which include a master station, enter into or withdraw from a double-ring network system (simply called "loop"). More specifically, transmission station nodes "i" (1≤i≤5; nodes 1 to 5) are connected to (or disconnected from) a loop as the first exemplary embodiment. As the second exemplary embodiment, it will be described that a transmission station hub "i" enters into a double-ring network system and branching station nodes "i" are connected (star-like connected) to the transmission station hub "i".

First Exemplary Embodiment

FIG. 1 is a schematic structure diagram in a control method of a double-ring network according to a first exemplary embodiment. The double-ring network includes two or more transmission stations each of which allows two-way communication and enters into the double-ring network. It is desirable to set any adjacent two transmission stations to be terminal stations and any transmission station to be a master station.

Each transmission station has the same structure as the master station. Each transmission station has a means for holding a transmission priority (logical address) of its own node informed by the master station, and a means for transmitting from its own node a transmission frame, which includes a connection request frame, a complete frame and the like, according to the transmission priority.

As shown in FIG. 2 (a), in the data transmission method disclosed in Patent document 1, a token is ordered in order of node address (physical address) at a synchronous time, which uniquely determines a transmission priority in order of node address. For example, nodes A and B are respectively set to be priority nodes 1 and 2.

The master node has a structure shown in FIG. 1 and determines a token order (transmission priority "0", "1", "2", "3", "4" . . . ; also called "logical address") in order of node connection by introducing a shortest path function, to realize path optimization, without depending on node addresses ((1), (2), (3), (4), (5) . . . ; also called "physical address") (see FIG. 2 (b)). This reduces a transmission time. In the drawings, values of physical addresses correspond to numerical numbers in parenthesis and values of logical addresses correspond to numerical numbers in square brackets.

(Structure of Each Element)

As shown in FIG. 1, the master station (node 1) includes a transmitting and receiving permission switch portion 10, and an A-system (clockwise) side communication port 20 (also called communication port A) and a B-system (anticlockwise) side communication port 30 (also called communication port B) that are connected to the transmitting and receiving permission switch portion 10. The communication port 20 has a receiver (RVR-A) and a transmitter (TVR-A) to perform two-way communication with an adjacent transmission station. The communication port 30 has a receiver (RVR-B) and a transmitter (TVR-B) to perform two-way communication with an adjacent transmission station.

A first receiving control circuit portion 40 is connected to the transmitting and receiving permission switch portion 10. A MAC/DLC (hereinafter called transmitting and receiving control circuit portion) 50 is connected to the first receiving control circuit portion 40. The transmitting and receiving permission switch portion 10, a frame detection determining circuit portion 60 and a frame data generating circuit portion 70 are connected to the transmitting and receiving control circuit portion 50. The transmitting and receiving permission switch portion 10, the first receiving control circuit portion 40 and the transmitting and receiving control circuit portion 50 are collectively called a transmitting and receiving portion.

A logical address determining circuit portion 80 is connected to the frame detection determining circuit portion 60. A live list setting circuit portion 90 (also simply called live list or LL) and an address list setting circuit portion 100 (also simply called address list or AL) are connected to the logical address determining circuit portion 80. The logical address determining circuit portion 80 and the address list setting circuit portion 100 are collectively called a shortest path function.

A computer portion 110 is connected to the live list setting circuit portion 90 and the address list setting circuit portion 100 and instructs the frame data generating circuit portion 70 to generate a certain frame. A physical address setting portion 120 is connected to the computer portion 110.

The master station does not determine a transmission priority according to physical addresses of transmission stations (nodes), but has the shortest path function that carries out control and setting such that the logical address determining circuit portion 80 determines logical addresses of transmission stations in order of node connection in the network and respectively associates physical addresses of transmission stations with the determined logical addresses.

Each element will be described below in detail.

The address list setting circuit portion 100 manages transmission priorities of transmission stations, which have physical addresses M (e.g., (1) to (5)), connected to the double-ring network using a hardware. The physical addresses are node addresses that are previously and uniquely assigned to the transmission stations and do not overlap one another. The address list setting circuit portion 100 includes a predetermined number (e.g., 256) of transmission priority setting circuits 101 (e.g., D-FF (D-type flip-flop)) to which numerical numbers (e.g., 0, 1, 2 . . . 255) are sequentially assigned (see FIG. 4). A transmission priority setting circuit 101 holds a physical address M, which is determined by the logical address determining circuit portion 80, based on a logical address in response to an address modification EN signal.

Namely, the transmission priority setting circuits 101 are arranged in order of the assigned numerical numbers, determine transmission priorities of the transmission stations, which have the physical addresses M, in order of the numerical numbers of the transmission priority setting circuits 101 without depending on the physical addresses M, and set the transmission priorities to the nodes. This allows each transmission station to transmit a transmission frame according to its own transmission priority when receiving an SYN frame, which reduces a transmission time. The conventional master station accepts an REQ frame from only nodes which are allowed to transmit it by the master station during MAC control time. Thus, in a case where 256 transmission stations (including the master station) enter into the network, the master station needs to perform 256 scans using SYN frames. In contrast, according to the present embodiment, once the master station transmits an SYN frame, each node returns an REQ frame according to its own transmission priority. This does not need to perform 256 scans to reduce a transmission time. The address list setting circuit portion 100 will be described in detail hereinafter with reference to the drawings.

Figure 3:
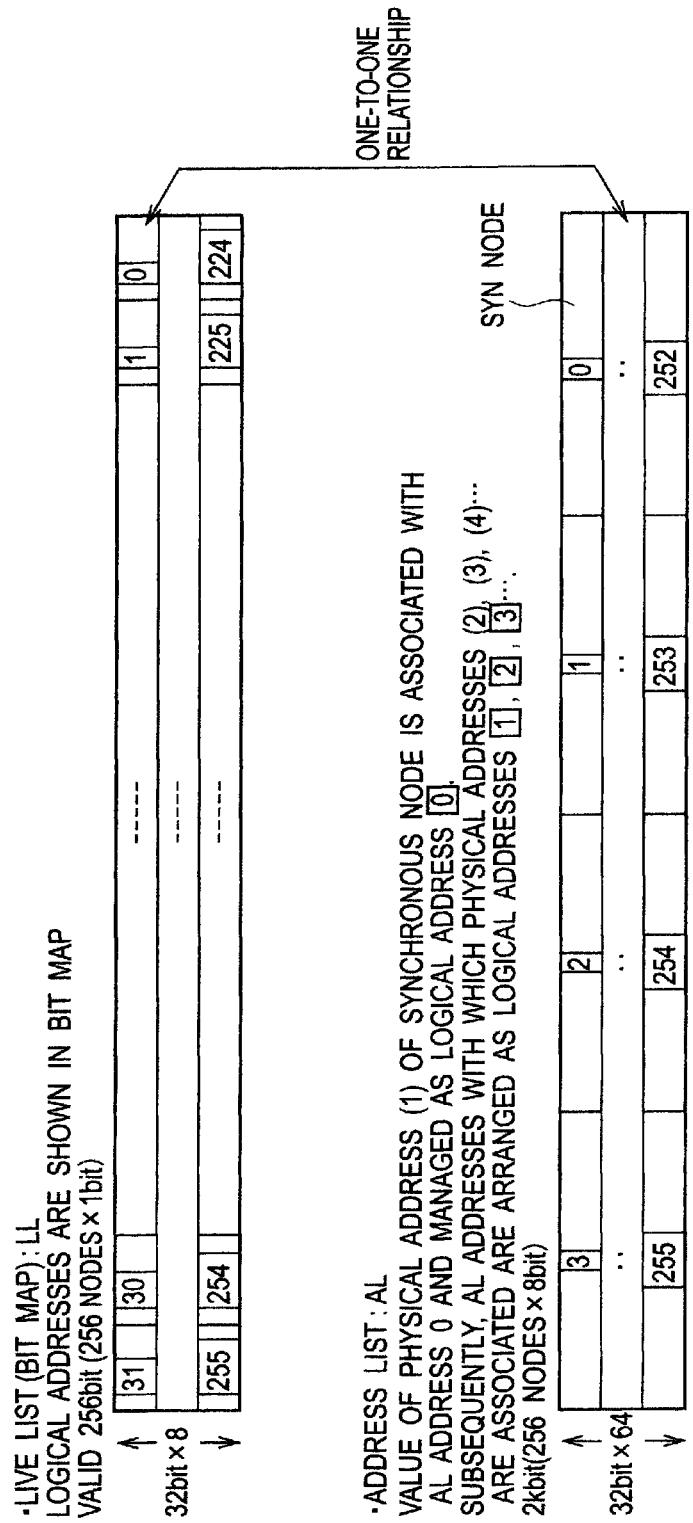
FIG. 3 is an explanatory diagram that illustrates a relationship between a live list and an address list according to the first exemplary embodiment.

The live list setting circuit portion 90 is a register (live list LL) that manages each logical address of transmission station set in the address list setting circuit portion 100. More specifically, the live list setting circuit portion 90 manages the transmission priorities set in the address list setting circuit portion 100 by one-to-one relationship between a logical address and a physical address of each transmission station (see FIG. 3). The logical address determining circuit portion 80 and the live list setting circuit portion 90 will be described in detail later with reference to FIG. 4.

The logical address determining circuit portion 80 determines a logical address which will be associated with a physical address M of transmission station (node) carrying out a connection request, according to (i) information as to whether the communication port A or the communication port B receives a connection request frame (REQ frame) and (ii) a logical address V of transmission station that relays the REQ frame and is adjacent to the transmission station (node), whose information is included in the REQ frame, carrying out the connection request. The logical address determining circuit portion 80 then sets the physical address M in a transmission priority setting circuit 101 corresponding to the determined logical address. The logical address determining circuit portion 80 determines a logical address with reference to a condition FG shown in FIG. 5, 6A and 6B. The condition FG of FIG. 6A will be described in the second exemplary embodiment.

Frame format will be described later. Abbreviations stand for the followings.

Pre: a preamble

FCS: a frame check code

LL: a live list, "0" to "255", 256 bits (valid/invalid 256 bits)

AL: an address list, "0" to "255", 8 bits*256 (physical address)

M: a physical address of node/hub carrying out a connection request ("1" to "254")

T: a type of node/hub carrying out a connection request (transmission station node/transmission station hub/branching station node)

V: a logical address of transmission station relaying an REQ frame ("1" to "255")

N: a logical address of node/hub transmitting a CMP frame or an LPD frame ("1" to "254")

JA: a star terminal logical address ("1" to "254") of hub in case where a transmission station hub relays an REQ frame from a branching station node carrying out a connection request;

a logical address ("1" to "254") of transmission station hub relaying an REQ frame in case where a transmission station hub relays an REQ frame from a transmission station node or a transmission station hub carrying out a connection request;

a fixed value ("255") in a case where a transmission station node relays an REQ frame from a branching station node carrying out a connection request; and a fixed value ("0") in a case where a transmission station node relays an REQ frame from a transmission station node or a transmission station hub carrying out a connection request.

The condition FG is the followings.

(1) determining whether a master station is a transmission station node, a transmission station hub or a branching station node;

(2) determining whether a master station receives an REQ frame through a communication port A, a communication port B or a star port (in a star connection where branching station nodes are connected to a transmission station hub) thereof;

(3) determining whether a node transmitting an REQ frame is a transmission station node, a transmission station hub or a branching station node;

(4) determining whether an REQ frame is not relayed by any node (V=0) and is received by a mater station or is relayed by any node (V≠0) and received by a master station (V: logical address of adjacent node relaying it);

(5) determining whether a node (REQ relaying node) relaying an REQ frame is a transmission station node, a transmission station hub or nothing (nothing: a master station is adjacent to a node carrying out a connection request and receives an REQ frame which is not relayed).

As shown in FIG. 5, a logical address is determined according to the determination result of condition FG. More specifically, in a case where a transmission station or the like newly enters into the network (loop), in order to set logical addresses sequentially in order of entering into the loop, the logical address determining circuit portion 80 respectively shifts one or more physical addresses of transmission stations, which have already entered into the loop and have been registered in one or more transmission priority setting circuits 101 corresponding to one or more valid logical addresses equal to or more than a logical address determined according to the determination result of condition FG, to one or more transmission priority setting circuits 101 corresponding to new one or more logical addresses each of which has a value generated by adding one to a value of each valid logical address equal to or more than the determined logical address ("+1" shift). The logical address determining circuit portion 80 then registers a physical address of the transmission station or the like newly entering into the loop in a transmission priority setting circuit 101 corresponding to the determined logical address.

In contrast, in a case where a transmission station withdraws from the loop, the logical address determining circuit portion 80 respectively shifts one or more physical addresses of transmission stations, which have already entered into the loop and have been registered in one or more transmission priority setting circuits 101 corresponding to one or more valid logical addresses more than a logical address of the withdrawing transmission station, to one or more transmission priority setting circuits 101 corresponding to new one or more logical addresses each of which has a value generated by subtracting one from a value of each valid logical address more than the logical address of the withdrawing transmission station ("−1" shift). These determinations of logical addresses will be described in "Description of operation of entire system" in detail. These determinations of logical addresses are realized using a hardware circuit and the determined logical addresses are set in the address list setting circuit portion 100.

Figure 4:
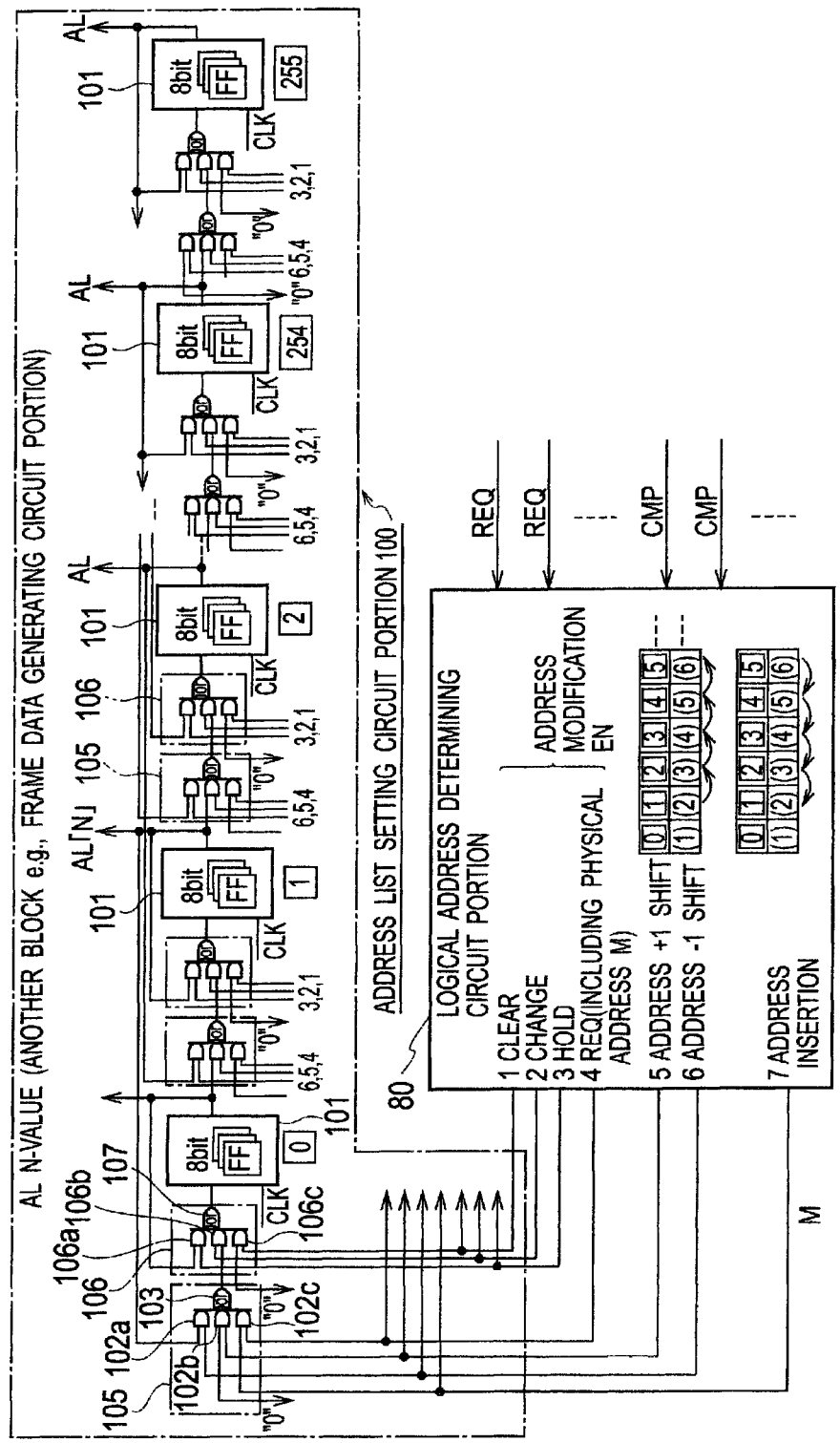
FIG. 4 is a schematic structure diagram of a logical address determining circuit portion and an address list setting circuit portion according to the first exemplary embodiment.

FIG. 4 is a schematic structure diagram of the logical address determining circuit portion 80 and the address list setting circuit portion 100. First, the address list setting circuit portion 100 will be described.

As shown in FIG. 4, for example, the address list setting circuit portion 100 includes 256 transmission priority setting circuits (D-FFs) 101 for setting a token order. These transmission priority setting circuits 101 have respectively node addresses (logical addresses) from an end in series. The logical addresses represent a token order to be determined on the loop. More specifically, in a case where the maximum number of nodes is 256, the address list setting circuit portion 100 includes 256 transmission priority setting circuits 101 each of which has an 8-bit D-FF (D-type flip-flop). Logical addresses "0", "1", "2", "3", "4" . . . "255" are sequentially assigned to the transmission priority setting circuits 101 from the end thereof. In the present embodiment, a logical address "0" is assigned to a master station.

At a former stage of each transmission priority setting circuit 101, there are an order shift instructing circuit 105 and a physical address hold instructing circuit 106. The order shift instructing circuit 105 includes ANDs 102*a*, 102*b* and 102*c*, an OR 103 and the like and shifts a transmission priority. The physical address hold instructing circuit 106 includes ANDs 106*a*, 106*b* and 106*c*, an OR 107 and the like and holds a set physical address. The order shift instructing circuit 105 is connected to the 8-bit D-FF via the physical address hold instructing circuit 106.

When a synchronous node is established, an "address insert" becomes valid in the logical address determining circuit portion 80, thereby the AND 102*c* of the order shift instructing circuit 105 and the AND 106*b* of the physical address hold instructing circuit 106 connected to the transmission priority setting circuit 101 to which the logical address "0" is assigned become valid. Thereby, a physical address of the synchronous node is held in the transmission priority setting circuit 101 to which the logical address "0" is assigned.

In contrast, when a synchronous node withdraws, a "logical address −1 shift" becomes valid in the logical address determining circuit portion 80, thereby the AND 102*a* of the order shift instructing circuit 105 and the AND 106*b* of the physical address hold instructing circuit 106 connected to the transmission priority setting circuit 101 to which the logical address "0" is assigned become valid. Thereby, a physical address having been held in the transmission priority setting circuit 101 to which the logical address "1" is assigned is held in the transmission priority setting circuit 101 to which the logical address "0" is assigned.

When the logical address "1" is specified by an REQ frame in the logical address determining circuit portion 80, an "address insert" becomes valid in the logical address determining circuit portion 80, thereby the AND 102*c* of the order shift instructing circuit 105 and the AND 106*b* of the physical address hold instructing circuit 106 connected to the transmission priority setting circuit 101 to which the logical address "1" is assigned become valid. Thereby, a physical address of a node, which carries out a connect request using the REQ frame, is held in the transmission priority setting circuit 101 to which the logical address "1" is assigned.

In contrast, when a node to which the logical address "0" or "1" is assigned withdraws, a "logical address −1 shift" becomes valid in the logical address determining circuit portion 80, thereby the AND 102*a* of the order shift instructing circuit 105 and the AND 106*b* of the physical address hold instructing circuit 106 connected to the transmission priority setting circuit 101 to which the logical address "1" is assigned become valid. Thereby, a physical address having been held in the transmission priority setting circuit 101 to which the logical address "2" is assigned is held in the transmission priority setting circuit 101 to which the logical address "1" is assigned.

When the logical address "2" is specified by an REQ frame in the logical address determining circuit portion 80, an "address insert" becomes valid in the logical address determining circuit portion 80, thereby the AND 102*c* of the order shift instructing circuit 105 and the AND 106*b* of the physical address hold instructing circuit 106 connected to the transmission priority setting circuit 101 to which the logical address "2" is assigned become valid. Thereby, a physical address of anode, which carries out a connect request using the REQ frame, is held in the transmission priority setting circuit 101 to which the logical address "2" is assigned.

Further, when the logical address "1" is specified by the REQ frame in the logical address determining circuit portion 80, a "logical address +1 shift" becomes valid in the logical address determining circuit portion 80, thereby the AND 102*b* of the order shift instructing circuit 105 and the AND 106*b* of the physical address hold instructing circuit 106 connected to the transmission priority setting circuit 101 to which the logical address "2" is assigned become valid. Thereby, a physical address having been held in the transmission priority setting circuit 101 to which the logical address "1" is assigned is held in the transmission priority setting circuit 101 to which the logical address "2" is assigned.

When a node to which the logical address "0", "1" or "2" is assigned withdraws, a "logical address −1 shift" becomes valid in the logical address determining circuit portion 80, thereby the AND 102*a* of the order shift instructing circuit 105 and the AND 106*b* of the physical address hold instructing circuit 106 connected to the transmission priority setting circuit 101 to which the logical address "2" is assigned become valid. Thereby, a physical address having been held in the transmission priority setting circuit 101 to which the logical address "3" is assigned is held in the transmission priority setting circuit 101 to which the logical address "2" is assigned.

When the logical address "254" is specified by an REQ frame in the logical address determining circuit portion 80, an "address insert" becomes valid in the logical address determining circuit portion 80, thereby the AND 102c of the order shift instructing circuit 105 and the AND 106b of the physical address hold instructing circuit 106 connected to the transmission priority setting circuit 101 to which the logical address "254" is assigned become valid. Thereby, a physical address of anode, which carries out a connect request using the REQ frame, is held in the transmission priority setting circuit 101 to which the logical address "254" is assigned.

When the logical addresses "1" to "253" are specified by REQ frames in the logical address determining circuit portion 80, a "logical address +1 shift" becomes valid in the logical address determining circuit portion 80, thereby the AND 102b of the order shift instructing circuit 105 and the AND 106b of the physical address hold instructing circuit 106 connected to the transmission priority setting circuit 101 to which the logical address "254" is assigned become valid. Thereby, a physical address having been held in the transmission priority setting circuit 101 to which the logical address "253" is assigned is held in the transmission priority setting circuit 101 to which the logical address "254" is assigned.

When a node to which the logical address "0", "1", "2" ... or "254" is assigned withdraws, a "logical address −1 shift" becomes valid in the logical address determining circuit portion 80, thereby the AND 102a of the order shift instructing circuit 105 and the AND 106b of the physical address hold instructing circuit 106 connected to the transmission priority setting circuit 101 to which the logical address "254" is assigned become valid. Thereby, a physical address having been held in the transmission priority setting circuit 101 to which the logical address "255" is assigned is held in the transmission priority setting circuit 101 to which the logical address "254" is assigned.

When the logical address "255" is specified by an REQ frame in the logical address determining circuit portion 80, an "address insert" becomes valid in the logical address determining circuit portion 80, thereby the AND 102c of the order shift instructing circuit 105 and the AND 106b of the physical address hold instructing circuit 106 connected to the transmission priority setting circuit 101 to which the logical address "255" is assigned become valid. Thereby, a physical address of a node, which carries out a connect request using the REQ frame, is held in the transmission priority setting circuit 101 to which the logical address "255" is assigned.

When the logical addresses "1" to "254" are specified by REQ frames in the logical address determining circuit portion 80, a "logical address +1 shift" becomes valid in the logical address determining circuit portion 80, thereby the AND 102b of the order shift instructing circuit 105 and the AND 106b of the physical address hold instructing circuit 106 connected to the transmission priority setting circuit 101 to which the logical address "255" is assigned become valid. Thereby, a physical address having been held in the transmission priority setting circuit 101 to which the logical address "254" is assigned is held in the transmission priority setting circuit 101 to which the logical address "255" is assigned.

When a node to which the logical address "0", "1", "2" ... or "255" is assigned withdraws, a "logical address −1 shift" becomes valid in the logical address determining circuit portion 80, thereby the AND 102a of the order shift instructing circuit 105 and the AND 106b of the physical address hold instructing circuit 106 connected to the transmission priority setting circuit 101 to which the logical address "255" is assigned become valid. Thereby, a value "0" is held in the transmission priority setting circuit 101 to which the logical address "255" is assigned.

Since proceedings of an "address insert", a "logical address −1 shift" and a "logical address +1 shift" for each of the logical addresses "3" to "253" are similar to those for the logical address "2" or "254", the description is omitted.

When the logical address determining circuit portion 80 receives CMP frames and an REQ frame after an SYN frame appears, it performs the above-described determinations to obtain a logical address to be associated with a physical address of transmission station entering into or withdrawing from the loop, and obtain a control value indicative of a shift direction (+1 shift or −1 shift) of physical addresses, which have been set in transmission priority setting circuits 101, to sequentially set the physical addresses in transmission priority setting circuits 101 based on the obtained logical address and the obtained control value.

Figure 7:
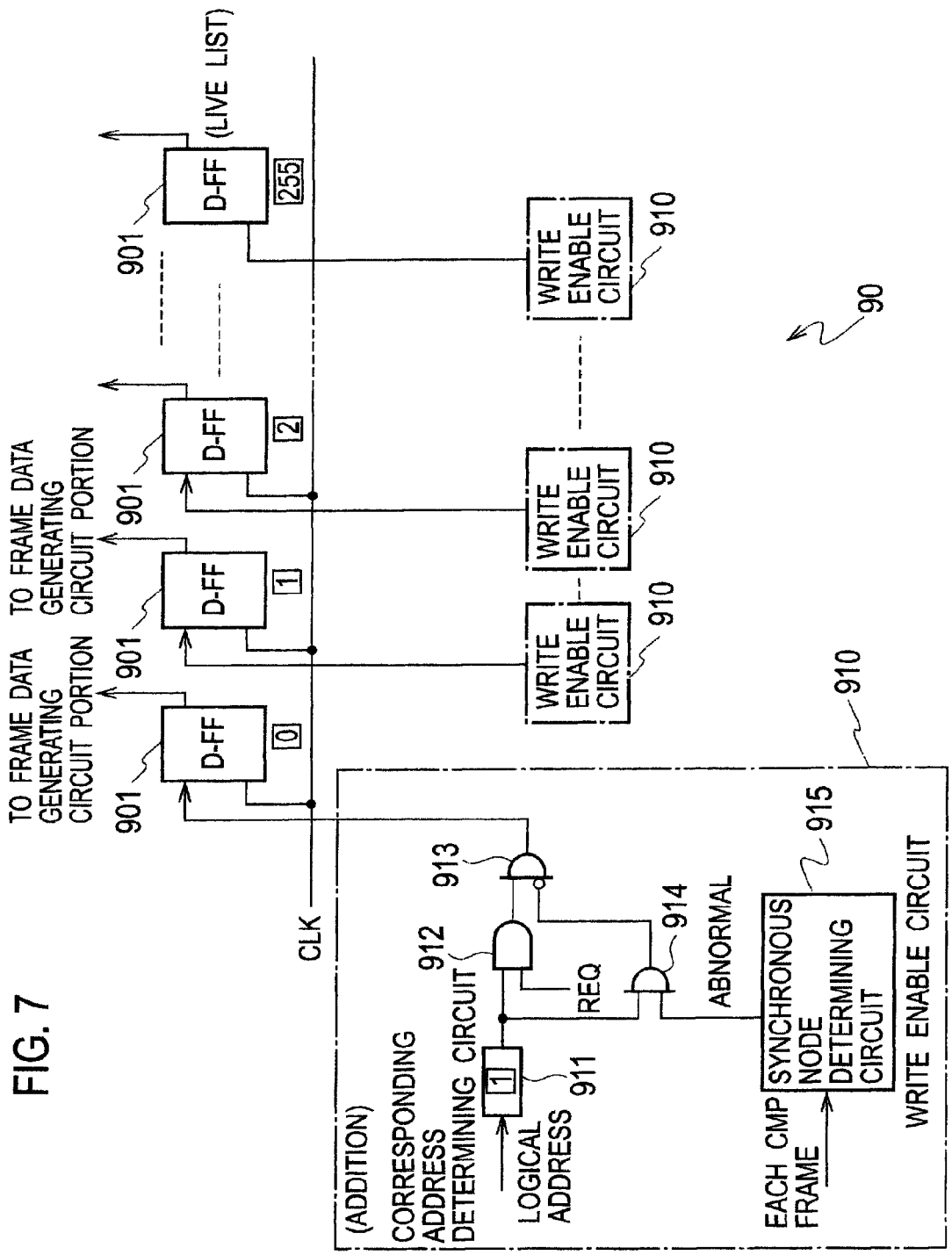
FIG. 7 is a schematic structure diagram of the live list setting circuit portion according to the first exemplary embodiment.

Next, the live list setting circuit portion 90 will be described with reference to FIG. 7. As shown in FIG. 7, the live list setting circuit portion 90 includes 256 D-FFs (D-type flip-flops) 901. Node addresses (logical addresses) "0" to "255" are sequentially assigned to the D-FFs 901 in order of the arrangement of the transmission priority setting circuits 101 in the address list setting circuit portion 100. Each D-FF 901 holds information as to whether or not a logical address assigned to a corresponding transmission priority setting circuit 101 is valid. Every time when a transmission station enters into the loop, a valid bit is sequentially set in D-FFs 901.

The live list setting circuit portion 90 further includes write enable circuits 910. Each write enable circuit 910 includes a corresponding address determining circuit 911, an AND 912, ORs 913 and 914, and a synchronous node determining circuit 915. The corresponding address determining circuit 911 receives a logical address from the logical address determining circuit portion 80 and determines whether or not the logical address matches a logical address of corresponding D-FF 901 previously set. The AND 912 carries out an AND operation for an output signal from the corresponding address determining circuit 911 and a physical address of transmission station included in an REQ frame. The synchronous node determining circuit 915 receives a CMP frame from each transmission station and determines whether or not the CMP frame is normally transmitted. The OR 914 carries out an OR operation for an output signal from the synchronous node determining circuit 915 and the output signal from the corresponding address determining circuit 911. The OR 913 carries out an OR operation for outputs from the AND 912 and the OR 914 and outputs an output signal to the corresponding D-FF 901.

Namely, for each write enable circuit 910, if a valid value is held in a corresponding 8 bit D-FF 101 in the address list setting circuit portion 100, a live list has a valid value "1". If a valid value is not held in a corresponding 8 bit D-FF 101 in the address list setting circuit portion 100, a live list has an invalid value "0".

The transmitting and receiving permission switch portion 10 is a control circuit for switching transmission and reception in a communication port based on an instruction signal from the MAC/DLC 50. The first receiving control circuit portion 40 determines that a transmission frame is input from either the communication port A or B. If there are transmission frames input from the communication ports A and B, the first receiving control circuit portion 40 switches one communication port from which a transmission frame is first input in preference to the other, until the reception is completed. An output from the first receiving control circuit portion 40 is input and reception-processed in the MAC/DLC 50. Although a terminal station can receive a transmission frame from either a communication portion A or B due to the ring topology, the terminal station normally turns off a reception permission switch at a side of communication port in a blocking state and turns on a reception permission switch at a side of communication port in a non-blocking state.

The transmitting and receiving control circuit portion (MAC/DLC) 50 controls transmission and reception of a transmission frame based on Ethernet (registered trademark) proceedings. The frame detection determining circuit portion 60 is a circuit for detecting a frame such as an SYN frame or a CMP frame. The frame data generating circuit portion 70 generates various frames according to addresses from the live list setting circuit portion 90 and the address list setting circuit portion 100 and control data of the computer portion 110, and transmits them to the transmitting and receiving control circuit portion 50. The computer portion 110 is a microprocessor that reads a necessary setting value and writes necessary data in a RAM according to program proceedings stored in a program memory (PROM and working RAM memory or PROM using RAM), and then temporarily holds or reads the necessary data to process it based on sequence proceedings or Ethernet (registered trademark) transmission proceedings in a transmission station. For example, the computer portion 110 transmits a physical address (unique number of transmission station), which is set in the physical address setting portion 120, to the frame data generating portion 70, the logical address determining circuit portion 80 or the like.

Each of nodes other than a master station has the same structure as the master station. When the master station withdraws from the loop, a node (station) having the second highest transmission priority determines a transmission priority (logical address) for anode and associates a logical address with a physical address of the node. When the master station does not withdraw from the loop, each of nodes other than the master station causes only a transmission priority setting circuit 101, which has a logical address of its own node, to be active in the address list setting circuit 100. Thereafter, a transmission priority is determined or a node to be set as a master station is determined according to a state of live list LL.

(Description of Operation of Entire System)

Figure 8:
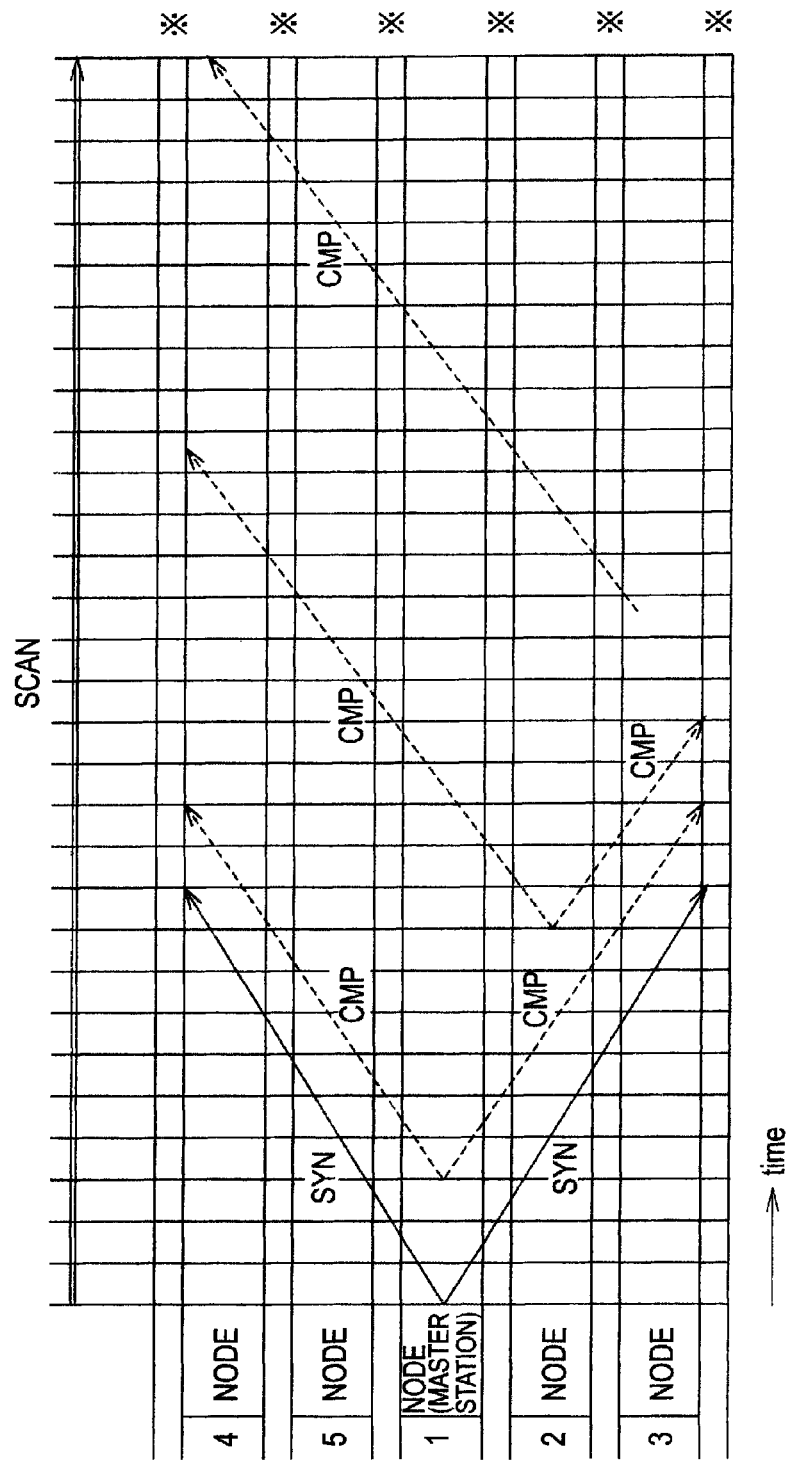
FIG. 8 is a sequence diagram in the control method of the double-ring network according to the first exemplary embodiment.
Figure 9:
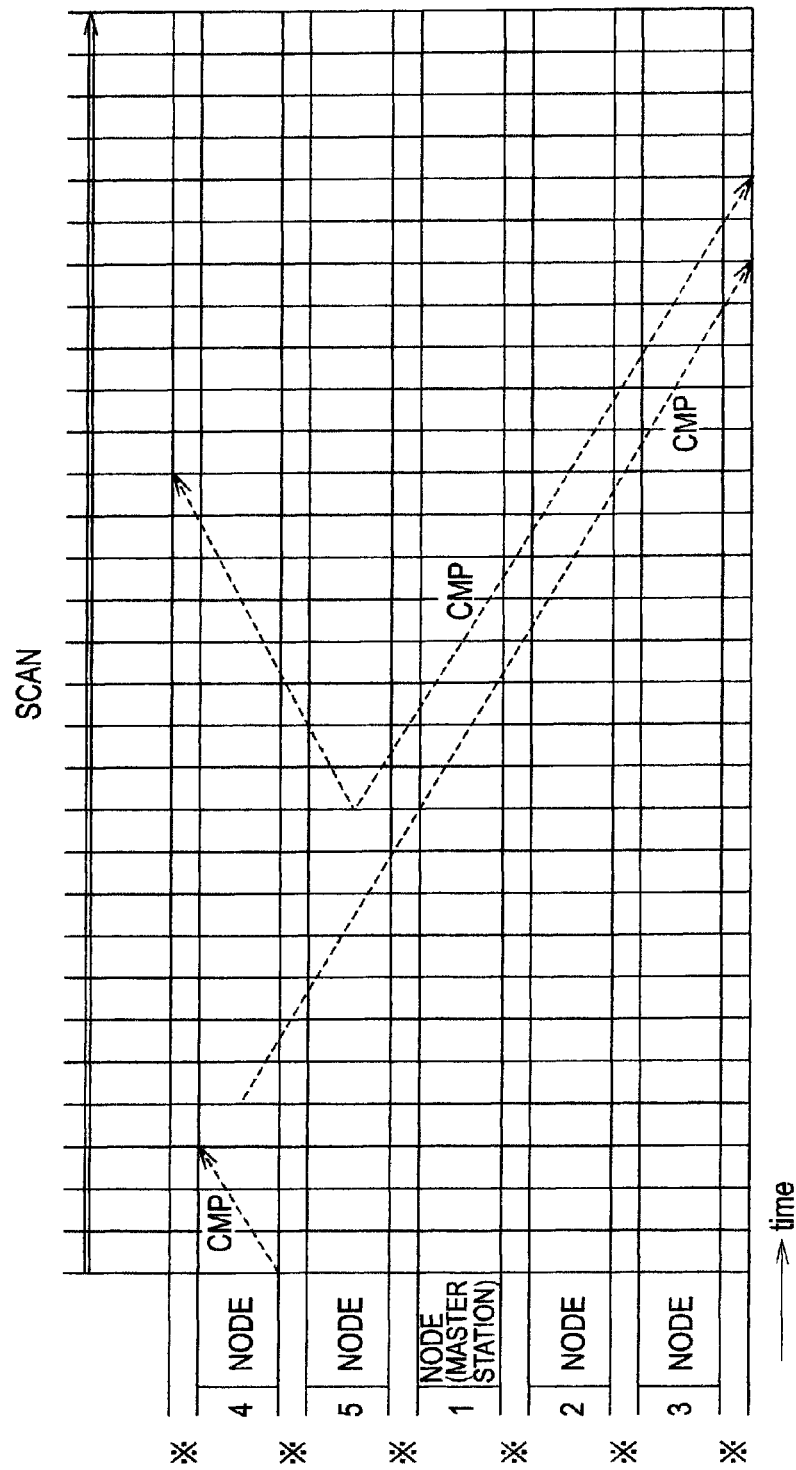
FIG. 9 is a sequence diagram in the control method of the double-ring network according to the first exemplary embodiment.

An operation of the double-ring network system will be described below. For connection of transmission stations, it is desirable to construct the B-system after the A-system is constructed or construct the A-system after the B-system is constructed. FIGS. 8 and 9 illustrate sequences of an SYN frame (solid line) and a CMP frame (dotted line) in a case where five transmission stations enter into the loop. Each node generates a CMP frame or the like when an SYN frame is transmitted.

An outline at a time when a transmission station enters into the loop will be described. In a first period during which an REQ frame is transmitted, a node (physical address M) which carries out a connection request transmits an REQ frame during an LPD time. In a second period during which an REQ frame is transmitted, an adjacent node (N-th node) which receives the REQ frame from the node carrying out a connection request relays the REQ frame to a synchronous node. In this way, a transmission frame is transmitted from a transmission station. FIGS. 11 to 16 illustrate frame forms in a zero period to a fifth period as one example. Data, which is included in the REQ frame to be transmitted and relayed, includes the physical address M of the node carrying out a connection request. In a third period during which an REQ frame is transmitted, the synchronous node updates an address list AL.

An outline at a time when a transmission station withdraws from the loop will be described. When the logical address determining circuit portion 80 of a master station searches an address list AL (address list setting circuit portion 100) in order of logical address and does not receive a normal CMP frame from a node, it deletes a physical address associated with a logical address corresponding to the node. Then, the logical address determining circuit portion 80 respectively shifts physical addresses of other nodes, which have valid logical addresses more than the logical address corresponding to the node, to new logical addresses each of which has a value generated by subtracting one from a value of valid logical address more than the logical address corresponding to the node.

Figure 10:
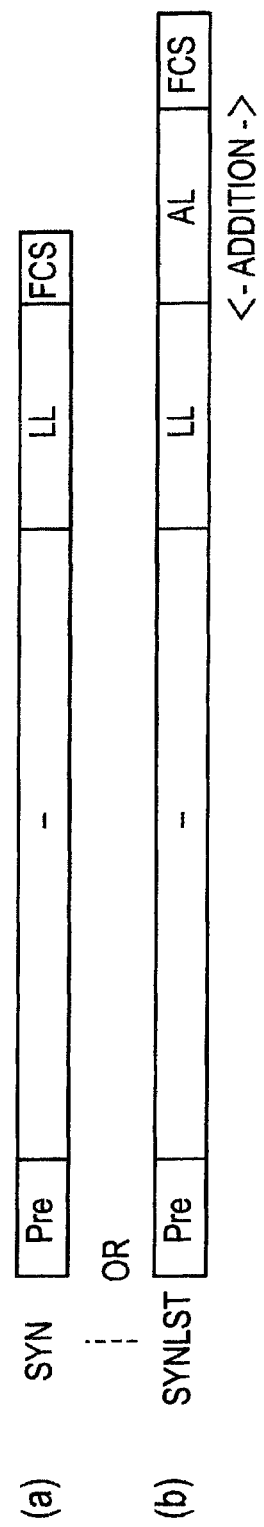
FIG. 10 is an explanatory diagram that illustrates synchronous frames according to the first and second exemplary embodiments.

Frames generated by the frame data generating circuit portion 70 and the computer portion 110 will be described. FIG. 10 is an explanatory diagram that illustrates an SYN frame. A synchronous node generates either an SYN frame (Pre, . . . LL, FCS) shown in FIG. 10(*a*) or an SYNLST frame (Pre, . . . LL, AL, FCS) shown in FIG. 10(*b*) and transmits it. The SYNLST frame is constructed by adding an address list AL to the SYN frame. A scan synchronizes depending on transmission of either the SYN frame or the SYNLST frame.

Figure 21:
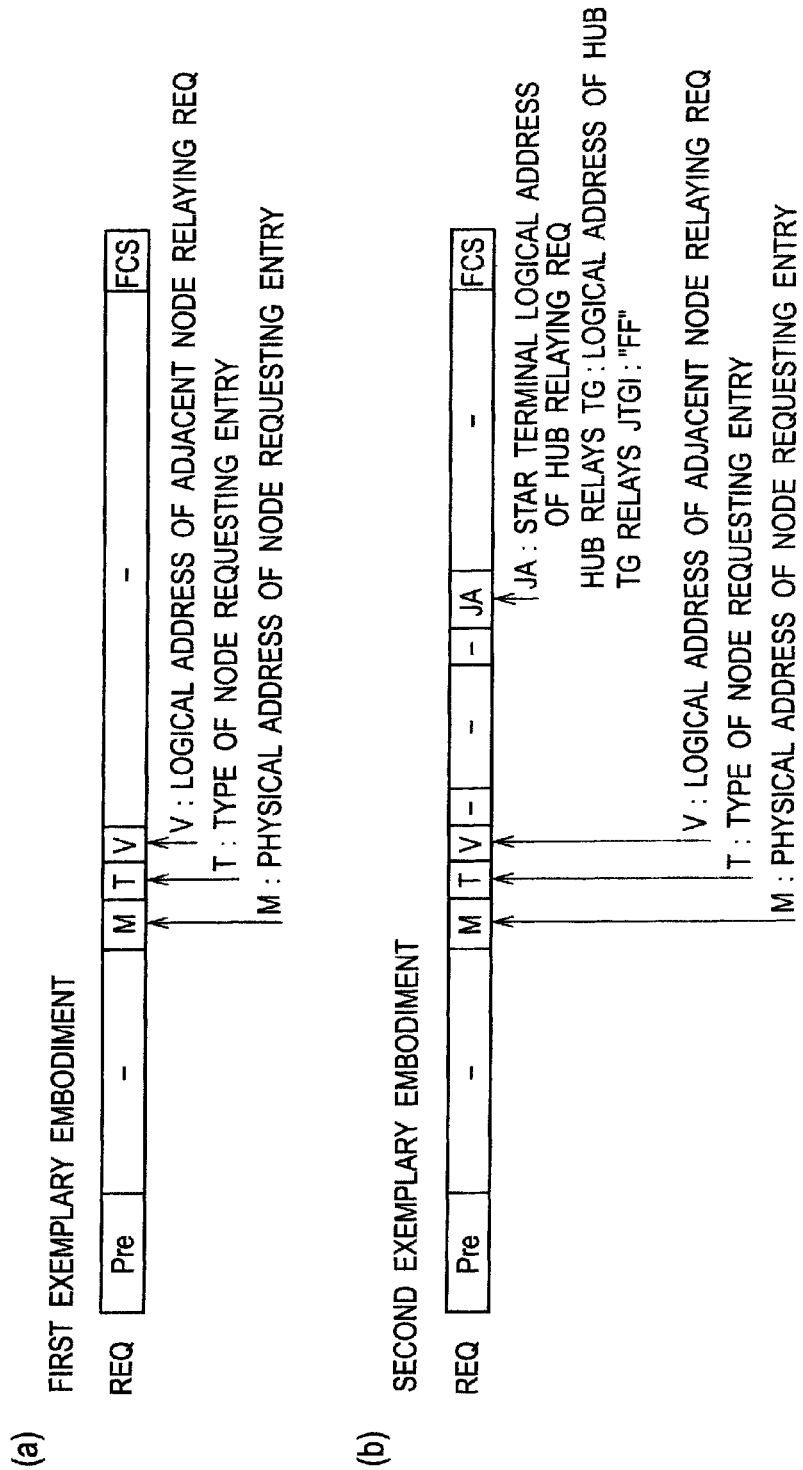
FIG. 21 is an explanatory diagram that illustrates connection request frames at a time when a hub enters into a loop according to the first and second exemplary embodiments.

An REQ frame will be described. A physical address of anode carrying out a connection request is added in an address list AL using the REQ frame (see FIG. 21). An REQ frame which will be described in the first exemplary embodiment is shown in FIG. 21(*a*). An REQ frame which will be described in the second exemplary embodiment is shown in FIG. 21(*b*). In view of a case where a branching station is connected to a transmission station hub in a star connection structure, the REQ frame shown in FIG. 21(*b*) is constructed by adding to the REQ frame shown in FIG. 21(*a*) a terminal logical address JA which indicates that the transmission station hub having a star connection structure has entered into a loop. The transmission station hub identifies a physical address of a branching station with reference to a LPD frame, searches (detects) an address list AL at a time of receiving SYNLST, and obtains a terminal logical address of the branching station following a logical address of the transmission station hub.

When a transmission station node or transmission station hub adjacent to a transmission station node, transmission station hub or branching station which transmits an REQ frame relays the REQ frame, the adjacent transmission station node or transmission station hub adds to the REQ frame a logical address associated with its own physical address in the master station. Further, when a transmission station hub having a star connection structure adjacent to a transmission station node or transmission station hub which transmits an REQ frame relays the REQ frame, the adjacent transmission station hub adds to the REQ frame a terminal logical address of branching station following a logical address associated with its own physical address in the master station.

Figure 19:
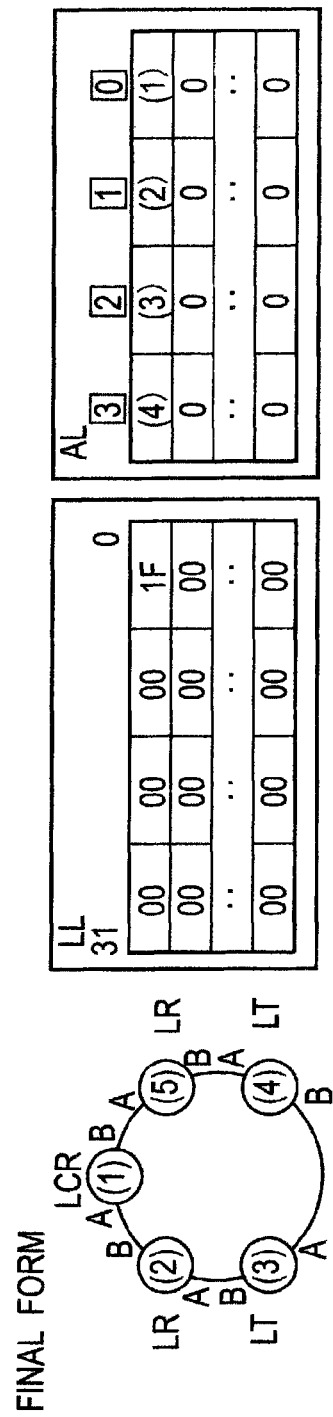
FIG. 19 is an explanatory diagram that illustrates an address list generated when a transmission station enters into the loop according to the first exemplary embodiment.

In the present embodiment, a synchronous node uses information of REQ frame and determines which communication port A or B receives the REQ frame (see FIG. 1). An REQ frame from a node adjacent to a synchronous node is received during an LPD time. An REQ frame which an adjacent node relays is received in slot time. FIGS. 17 to 19 are explanatory diagrams each of which illustrates an address list generated when a transmission station enters into a loop.

An operation at a time when a transmission station node "i" (1≤i≤5) enters into a loop will be described below in detail. Since operations of ANDs, ORs and D-FFs in the live list setting circuit portion 90 and the address list setting circuit portion 100, which will be described below, are the same as those described above, the description of operations of them is omitted. It is noted that the master station may mange the following association between a physical address and a logical address on software, using the live list LL and the address list AL shown in FIG. 3.

(Operation at Time when Transmission Station Enters into Loop)

FIG. 17 is an explanatory diagram that illustrates an address list generated when a transmission station enters into a loop. FIG. 17(a) shows an initial state of address list AL. In the address list AL, all transmission priority setting circuits (8 bits D-FFs) 101 in the address list setting circuit portion 100 are tabulated in order of logical addresses. Numerical numbers "0", "1", "2", "3", "4", "5", "6", "7" ... "254" and "255" are indicative of unique numbers (logical addresses) of the transmission priority setting circuit 101. (Case 0: 6.0)

Figure 11:
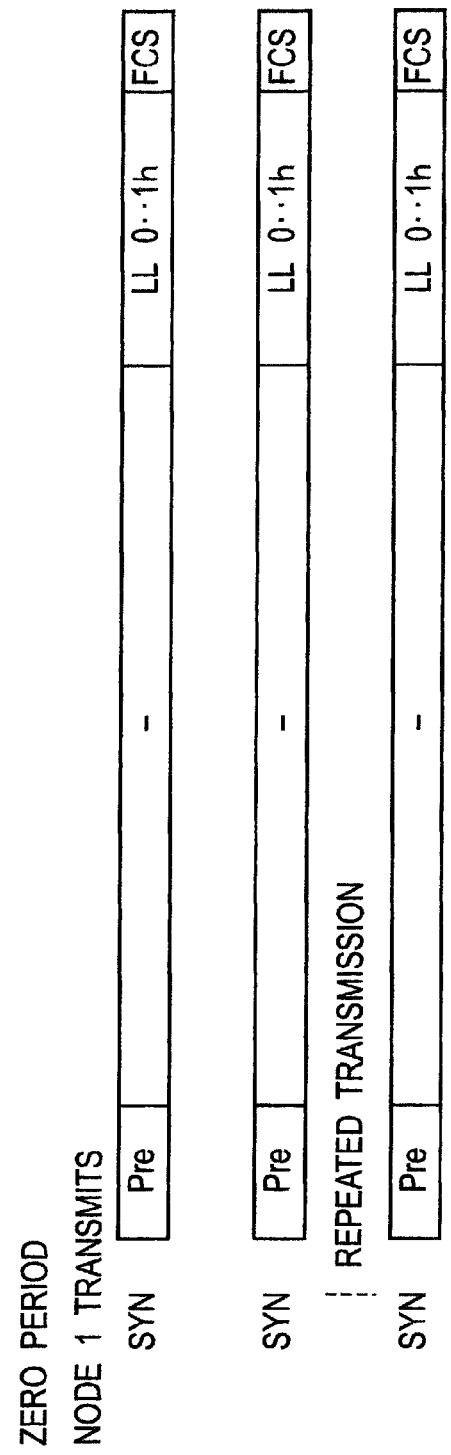
FIG. 11 is an explanatory diagram that illustrates frames in a zero period according to the first exemplary embodiment.

As shown in FIG. 17(b), when a transmission station node 1 enters into a loop, the transmission station node 1 becomes a synchronous node and generates an SYN frame and a CMP frame (see FIG. 11, zero period). As shown in FIG. 17(c), the logical address determining circuit portion 80 transmits an address modification EN and a logical address determining signal and sets a physical address (1) of the transmission station node 1 in a transmission priority setting circuit 101 to which a logical address "0" is assigned. Thus, the logical address determining circuit portion 80 registers the physical address (1) in a transmission priority setting circuit 101 including an 8-bit D-FF to which the logical address "0" is assigned (the address modification is set to "change", an address insertion, the address modification is set to "hold" after the physical address (1) is output). At this time, a D-FF 901 having a logical address "0" in the live list LL (live list setting circuit portion 90) becomes valid. In the case where the master station manages the association between a physical address and a logical address on software, as shown in FIG. 17(d), the live list LL and the address list AL are set. It is noted that logical addresses are omitted in the second or more rows in FIG. 17(d).

(Node-Communication Port A-Case 1: 6.1)

As shown in FIG. 17(e), a transmission station node 2 transmits an REQ frame to the communication port A of the synchronous node and enters into the loop. When the transmission station node 2 enters into the loop, the computer portion 110 of the transmission station node 1 instructs the frame data generating circuit portion 70 to generate an SYN frame. The transmitting and receiving control circuit portion 50 transmits the SYN frame to the communication ports A and B via the transmitting and receiving permission switch 10. The computer portion 110 of the transmission station node 2 instructs the frame data generating circuit portion 70 to generate an REQ frame. The transmitting and receiving control circuit portion 50 transmits the REQ frame to the communication port B via the transmitting and receiving permission switch 10 to transmit the REQ frame to the loop. At this time, the physical address setting portion 120 sets a physical address in the computer portion 110. In the transmission station node (master station) 1, the REQ frame is relayed through the transmitting and receiving permission switch 10, the first receiving control circuit portion 40 and the transmitting and receiving control circuit portion 50, and detected in the frame detection determining circuit portion 60.

When the REQ frame is detected, the logical address determining circuit portion 80 determines where a physical address (2) of the transmission station node 2 newly entering into the loop will be inserted in the address list AL. In detail, the logical address determining circuit portion 80 determines the above-described condition FG ((1) to (5)). In a case where the determination result of condition FG is a case 1 (6.1: a transmission node is transmission station node, an REQ frame is received in communication port A, and there is not an adjacent relay node) in FIG. 5, the logical address determining circuit portion 80 registers the physical address (2) in a transmission priority setting circuit 101 to which the logical address "1" is assigned (the address modification is set to "change", an address insertion, the address modification is set to "hold" after the physical address (2) is output). At this time, a D-ff 901 having a logical address "1" in the live list LL (live list setting circuit portion 90) becomes valid (a value "1" is assigned). In the case where the master station manages the association between a physical address and a logical address on software the address list AL has a state shown in FIG. 17(f).

(Node-Communication Port B-Case 6: 6.2)

As shown in FIG. 18(a), a transmission station node 5 transmits an REQ frame to the communication port B of the synchronous node and enters into the loop. The logical address determining circuit portion 80 determines the above-described condition FG ((1) to (5)). In a case where the determination result of condition FG is a case 6 (6.2: a transmission node is transmission station node, an REQ frame is received in communication port B, and there is not an adjacent relay node) in FIG. 5, the logical address determining circuit portion 80 registers the physical address (5), which is included in the REQ frame from the transmission station node 5, in a transmission priority setting circuit 101 to which the logical address "2" being a current terminal logical address is assigned (the address modification EN is set to "change", an address insertion, the address modification EN is set to "hold" after the physical address (5) is output). Although the physical address (5) should be associated with a logical address smaller than the logical address "0" by one address, there is not the logical address smaller than the logical address "0" by one address. Due to this, the logical address determining circuit portion 80 associates the physical address (5) with the current terminal logical address. At this time, a D-FF 901 having a logical address "2" in the live list LL (live list setting circuit portion 90) becomes valid (a value "1" is assigned). In the case where the master station manages the association between a physical address and a logical address on software, the address list AL has a state shown in FIG. 18(b).

(Node-Communication Port A-Case 2: 6.3)

As shown in FIG. 18(c), a transmission station node 3 transmits an REQ frame to the communication port A of the synchronous node and enters into the loop. The logical address determining circuit portion 80 determines the above-described condition FG ((1) to (5)). In a case where the determination result of condition FG is a case 2 (6.3: a transmission node is transmission station node, an REQ frame is received in communication port A, and an adjacent relay node is transmission station node) in FIG. 5, the logical address determining circuit portion 80 shifts the physical address (5) registered in the transmission priority setting circuit 101 to which the logical address "2" is assigned, to a transmission priority setting circuit 101 to which a logical address "3" is assigned ("+1" shift, FIG. 18(d)), and then registers a physical address (3), which is included in the REQ frame from the transmission station node 3, in the transmission priority setting circuit 101 to which the logical address "2" is assigned. At this time, a D-FF 901 having a logical address "3" in the live list LL (live list setting circuit portion 90) becomes valid (a value "1" is assigned). In the case where the master station manages the association between a physical address and a logical address on software, the address list AL has a state shown in FIG. 18(e) through the process shown in FIG. 18(d).

Namely, when the REQ frame (M=(3), V="1"), which is transmitted from the transmission station node 3 (physical address (3)) and relayed by the transmission station node 2 whose physical address (2) is registered in the transmission priority setting circuit 101 to which the logical address "1" is assigned, is input through the communication portion A, the logical address determining circuit portion 80 obtains a logical address "V+1=2" generated by adding one to the logical address "V=1". The logical address determining circuit portion 80 determines that the physical address (5) set in the transmission priority setting circuit 101 corresponding to the logical address "2" is a physical address to be shifted. Then, the logical address determining circuit portion 80 shifts the physical address (5) to the transmission priority setting circuit 101 corresponding to the logical address "3" generated by adding one to the logical address "2" and registers the physical address (3) in the transmission priority setting circuit 101 corresponding to the logical address "2" (the address modification EN is set to "change", an address insertion, the address modification EN is set to "hold" after the physical address (3) is output, see FIG. 18(*e*)). In FIG. 18(*c*), although a line is drawn such that a numerical number "2" surrounded by a dotted line moves, this does not indicate that the logical address "2" moves. This indicates that the logical address "2" is associated with a physical address of a transmission station newly entering into the loop. FIGS. 18(*f*), 22(*c*), 22(*e*), 22(*g*), 23(*a*), 23(*c*), 23(*e*), 24(*a*), 24(*c*), 24(*e*) and 26(*a*) have the same illustrations as FIG. 18(*c*).

(Node-Communication Port B-Case 7: 6.4)

As shown in FIG. 18(*f*), a transmission station node 4 transmits an REQ frame to the communication port B of the synchronous node and enters into the loop (between the transmission station nodes 3 and 5). The logical address determining circuit portion 80 determines the above-described condition FG ((1) to (5)). In a case where the determination result of condition FG is a case 7 (6.4: a transmission node is transmission station node, an REQ frame is received in communication port B, and an adjacent relay node is transmission station node) in FIG. 5, the logical address determining circuit portion 80 shifts the physical address (5) registered in the transmission priority setting circuit 101 to which the logical address "3" is assigned, to a transmission priority setting circuit 101 to which a logical address "4" is assigned ("+1" shift, FIG. 18(*g*)), and then registers a physical address (4), which is included in the REQ frame from the transmission station node 4, in the transmission priority setting circuit 101 to which the logical address "3" is assigned (see FIG. 18(*h*)).

Namely, when the REQ frame (M=(4), V="3"), which is transmitted from the transmission station node 4 (physical address (4)) and relayed by the transmission station node 5 whose physical address (5) is registered in the transmission priority setting circuit 101 to which the logical address "3" is assigned, is input through the communication portion B, the logical address determining circuit portion 80 obtains a logical address "V=3". The logical address determining circuit portion 80 determines that the physical address (5) set in the transmission priority setting circuit 101 corresponding to the logical address "3" is a physical address to be shifted. Then, the logical address determining circuit portion 80 shifts the physical address (5) to the transmission priority setting circuit 101 corresponding to the logical address "4" generated by adding one to the logical address "3" and registers the physical address (4) in the transmission priority setting circuit 101 corresponding to the logical address "3" (the address modification EN is set to "change", an address insertion, the address modification EN is set to "hold" after the physical address (4) is output, see FIG. 18(*h*)). At this time, a D-FF 901 having a logical address "4" in the live list LL (live list setting circuit portion 90) becomes valid (a value "1" is assigned). In the case where the master station manages the association between a physical address and a logical address on software, the address list AL has a state shown in FIG. 18(*h*) through the process shown in FIG. 18(*g*). Finally, the live list LL and the address list AL have final states shown in FIG. 19. It is noted that logical addresses are omitted in the second or more rows in FIG. 19.

In contrast, in a case where a transmission station node withdraws from the loop, the logical address determining circuit portion 80 respectively shifts one or more physical addresses of transmission stations, which have already entered into the loop and have been registered in one or more transmission priority setting circuits 101 corresponding to one or more valid logical addresses more than a logical address of the withdrawing transmission station, to one or more transmission priority setting circuits 101 corresponding to new one or more logical addresses each of which has a value generated by subtracting one from a value of each valid logical address more than the logical address of the withdrawing transmission station ("−1" shift).

Accordingly, every time when a transmission station enters into a loop, a master station determines transmission priorities of transmission stations according to a connection order in which the transmission stations are connected to the loop, and sets the transmission priorities to the transmission stations. The transmission stations can sequentially return a frame according to transmission priorities (logical addresses) when receiving an SYN frame. This reduces a transmission time.

Second Exemplary Embodiment

FIG. 20 is a schematic structure diagram in a control method of a double-ring network according to the second exemplary embodiments. As the second exemplary embodiment, it will be described that a transmission station hub "i" enters into a loop and branching station nodes "i" are connected (star-like connected) to the transmission station hub "i". In FIG. 20, a transmission station hub 1 is connected between the transmission station nodes 2 and 3, and a transmission station hub 2 is connected between the transmission station nodes 4 and 5. Branching station nodes 1 and 2 are star-like connected to the transmission station hub 1. Branching station nodes 3 and 4 are star-like connected to the transmission station hub 2. A master station 1 has the same structure as the master station 1 shown in FIG. 1.

An operation at a time when a transmission station hub enters into a loop will be described below in detail, with reference to FIG. 22. When a transmission station hub "i" enters into a loop, an REQ frame shown in FIG. 21(*b*) from the transmission station hub "1" is constructed by adding JA (star terminal logical address of hub) to the REQ frame shown in FIG. 21(*a*). The REQ frame is generated in a frame data generating circuit portion 70 of the transmission station hub "i". In the present embodiment, a physical address (1) of the master station is registered in a transmission priority setting circuit 101 to which a logical address "0" is assigned. A D-FF 901 having a logical address "0" in the live list LL (live list setting circuit portion 90) becomes valid (a value "1" is assigned).

(Node-Communication Port B-Case 6: 7.1)

As shown in FIG. 22(*a*), a transmission station node 7 transmits an REQ frame to the communication port B of the synchronous node and enters into the loop. The logical address determining circuit portion 80 determines the above-described condition FG ((1) to (5)). In a case where the determination result of condition FG is a case 6 (7.1: a transmission node is transmission station node, an REQ frame is received in communication port B, and there is not an adjacent relay node) in FIGS. 5 and 6, the logical address determining circuit portion 80 registers the physical address (7), which is included in the REQ frame from the transmission station node 7, in a transmission priority setting circuit 101 to which the logical address "1" being a current terminal logical address is assigned (the address modification EN is set to "change", an address insertion, the address modification EN is set to "hold" after the physical address (7) is output). At this time, a D-FF 901 having a logical address "1" in the live list LL (live list setting circuit portion 90) becomes valid (a value "1" is assigned), and the logical addresses "0" and "1" are valid in the live list LL. In the case where the master station manages the association between a physical address and a logical address on software, the address list AL has a state shown in FIG. 22(b).

(Node-Communication Port A-Case 1: 7.2)

As shown in FIG. 22(c), a transmission station node 2 transmits an REQ frame to the communication port A of the synchronous node and enters into the loop. The logical address determining circuit portion 80 determines the above-described condition FG ((1) to (5)). In a case where the determination result of condition FG is a case 1 (7.2: a transmission node is transmission station node, an REQ frame is received in communication port A, and there is not an adjacent relay node) in FIGS. 5 and 6, the logical address determining circuit portion 80 shifts the physical address (7) registered in the transmission priority setting circuit 101 to which the logical address "1" is assigned, to a transmission priority setting circuit 101 to which a logical address "2" is assigned ("+1" shift, FIG. 22(d)), and then registers a physical address (2), which is included in the REQ frame from the transmission station node 2, in the transmission priority setting circuit 101 to which the logical address "1" is assigned (see FIG. 22(d)).

Namely, when the REQ frame (M=(2), V="1"), which is transmitted from the transmission station node 2 (physical address (2)) and is not relayed by any transmission station node, is input through the communication portion A, the logical address determining circuit portion 80 obtains a logical address "1". The logical address determining circuit portion 80 determines that the physical address (7) set in the transmission priority setting circuit 101 corresponding to the logical address "1" is a physical address to be shifted. Then, the logical address determining circuit portion 80 shifts the physical address (7) to the transmission priority setting circuit 101 corresponding to the logical address "2" generated by adding one to the logical address "1" and registers the physical address (2) in the transmission priority setting circuit 101 corresponding to the logical address "1" (the address modification EN is set to "change", an address insertion, the address modification EN is set to "hold" after the physical address (2) is output, see FIG. 22(d)). At this time, a D-FF 901 having a logical address "2" in the live list LL (live list setting circuit portion 90) becomes valid (a value "1" is assigned), and the logical addresses "0", to "2" are valid in the live list LL. In the case where the master station manages the association between a physical address and a logical address on software, the address list AL has a state shown in FIG. 22(d).

(Node-Communication Port A-Connection Request Transmission Station Hub-Case 2: 7.3)

As shown in FIG. 22(e), a transmission station hub 3 transmits an REQ frame to the communication port A of the synchronous node and enters into the loop. The logical address determining circuit portion 80 determines the above-described condition FG ((1) to (5)). In a case where the determination result of condition FG is a case 2 (7.3: a transmission node is transmission station hub, an REQ frame is received in communication port A, and an adjacent relay node is transmission station node) in FIG. 6A, the logical address determining circuit portion 80 shifts the physical address (7) registered in the transmission priority setting circuit 101 to which the logical address "2" is assigned, to a transmission priority setting circuit 101 to which a logical address "3" is assigned ("+1" shift), and then registers a physical address (3), which is included in the REQ frame from the transmission station hub 3, in the transmission priority setting circuit 101 to which the logical address "2" is assigned.

Namely, when the REQ frame (M=(3), V="1"), which is transmitted from the transmission station hub 3 (physical address (3)) and relayed by the transmission station node 2 whose physical address (2) is registered in the transmission priority setting circuit 101 to which the logical address "1" is assigned, is input through the communication portion A, the logical address determining circuit portion 80 obtains a logical address "V+1=2" generated by adding one to the logical address "V=1". The logical address determining circuit portion 80 determines that the physical address (7) set in the transmission priority setting circuit 101 corresponding to the logical address "2" is a physical address to be shifted. Then, the logical address determining circuit portion 80 shifts the physical address (7) to the transmission priority setting circuit 101 corresponding to the logical address "3" generated by adding one to the logical address "2" and registers the physical address (3) in the transmission priority setting circuit 101 corresponding to the logical address "2" (the address modification EN is set to "change", an address insertion, the address modification EN is set to "hold" after the physical address (3) is output, see FIG. 22(f)). At this time, a D-FF 901 having a logical address "3" in the live list LL (live list setting circuit portion 90) becomes valid (a value "1" is assigned), and the logical addresses "0" to "3" are valid in the live list LL. In the case where the master station manages the association between a physical address and a logical address on software, the address list AL has a state shown in FIG. 22(f).

(Node-Communication Port B-Connection Request Transmission Station Hub-Case 7: 7.4)

As shown in FIG. 22(g), a transmission station hub 6 transmits an REQ frame to the communication port B of the synchronous node and enters into the loop between the transmission station hub 3 and the transmission station node 7. The logical address determining circuit portion 80 determines the above-described condition FG ((1) to (5)). In a case where the determination result of condition FG is a case 7 (7.4: a transmission node is transmission station hub, an REQ frame is received in communication port B, and an adjacent relay node is transmission station node) in FIG. 6A, the logical address determining circuit portion 80 shifts the physical address (7) registered in the transmission priority setting circuit 101 to which the logical address "3" is assigned, to a transmission priority setting circuit 101 to which a logical address "4" is assigned ("+1" shift), and then registers a physical address (6), which is included in the REQ frame from the transmission station hub 6, in the transmission priority setting circuit 101 to which the logical address "3" is assigned.

Namely, when the REQ frame (M=(6), V="3"), which is transmitted from the transmission station hub 6 (physical address (6)) and relayed by the transmission station node 7 whose physical address (7) is registered in the transmission priority setting circuit 101 to which the logical address "3" is assigned, is input through the communication portion B, the logical address determining circuit portion 80 obtains a logical address "V=3". The logical address determining circuit portion 80 determines that the physical address (7) set in the transmission priority setting circuit 101 corresponding to the logical address "3" is a physical address to be shifted. Then, the logical address determining circuit portion 80 shifts the physical address (7) to the transmission priority setting circuit 101 corresponding to the logical address "4" generated by adding one to the logical address "3" and registers the physical address (6) in the transmission priority setting circuit 101 corresponding to the logical address "3" (the address modification EN is set to "change", an address insertion, the address modification EN is set to "hold" after the physical address (6) is output, see FIG. 22(*h*)). At this time, a D-FF 901 having a logical address "4" in the live list LL (live list setting circuit portion 90) becomes valid (a value "1" is assigned), and the logical addresses "0" to "4" are valid in the live list LL. In the case where the master station manages the association between a physical address and a logical address on software, the address list AL has a state shown in FIG. 22(*h*).
(Node-Communication Port A-Connection Request Branching Station Node-Case 5: 7.5)

As shown in FIG. 23(*a*), a branching station node 11 transmits an REQ frame to the communication port A of the synchronous node and enters into the loop. The logical address determining circuit portion 80 determines the above-described condition FG ((1) to (5)). In a case where the determination result of condition FG is a case 5 (7.5: a transmission node is branching station node, an REQ frame is received in communication port A, and an adjacent relay node is transmission station hub) in FIG. 6A, the logical address determining circuit portion 80 respectively shifts the physical address (6) of transmission station hub 6 and the physical address (7) of transmission station node 7, which have been registered in two transmission priority setting circuits 101 corresponding to the logical addresses "3" and "4" equal to or more than the logical address "3" determined according to the determination result of condition FG (within the valid logical addresses "0" to "4"), to two transmission priority setting circuits 101 corresponding to two logical addresses "4" and "5" each of which has a value generated by adding one to a value of each valid logical address equal to or more than the logical address "3" ("+1" shift). The logical address determining circuit portion 80 then registers a physical address (11), which is included in the REQ frame from the branching station node 11, in the transmission priority setting circuit 101 corresponding to the logical address "3" (see FIG. 23(*b*)).

Namely, when the REQ frame (M=(11), V="2", T=branching station node), which is transmitted from the branching station node 11 (physical address (11)) and relayed by the transmission station hub 3 whose physical address (3) is registered in the transmission priority setting circuit 101 to which the logical address "2" is assigned, is input through the communication portion A, the logical address determining circuit portion 80 obtains a logical address "V+1=3" generated by adding one to the logical address "V=2". The logical address determining circuit portion 80 determines that the physical addresses (6) and (7) set in the transmission priority setting circuits 101 corresponding to the logical address "3" and "4" are physical addresses to be shifted. Then, the logical address determining circuit portion 80 respectively shifts the physical address (6) of transmission station hub 6 and the physical address (7) of transmission station node 7, which have been registered in two transmission priority setting circuits 101 corresponding to the logical addresses "3" and "4" equal to or more than the logical address "3" (within the valid logical addresses "0" to "4"), to two transmission priority setting circuits 101 corresponding to two logical addresses "4" and "5" each of which has a value generated by adding one to a value of each valid logical address equal to or more than the logical address "3". The logical address determining circuit portion 80 then registers the physical address (11) in the transmission priority setting circuit 101 corresponding to the logical address "3" (the address modification EN is set to "change", an address insertion, the address modification EN is set to "hold" after the physical address (11) is output, see FIG. 23(*b*)). At this time, a D-FF 901 having a logical address "5" in the live list LL (live list setting circuit portion 90) becomes valid (a value "1" is assigned), and the logical addresses "0" to "5" are valid in the live list LL. In the case where the master station manages the association between a physical address and a logical address on software, the address list AL has a state shown in FIG. 23(*b*).
(Node-Communication Port A-there is Hub Relay-Case 3: 7.6)

As shown in FIG. 23(*c*), a transmission station node 4 transmits an REQ frame to the communication port A of the synchronous node and enters into the loop. The logical address determining circuit portion 80 determines the above-described condition FG ((1) to (5)). In a case where the determination result of condition FG is a case 3 (7.6: a transmission node is transmission station node, an REQ frame is received in communication port A, and an adjacent relay node is transmission station hub) in FIG. 6A, the logical address determining circuit portion 80 respectively shifts the physical address (6) of transmission station hub 6 and the physical address (7) of transmission station node 7, which have been registered in two transmission priority setting circuits 101 corresponding to the logical addresses "4" and "5" equal to or more than the logical address "4" determined according to the determination result of condition FG (within the valid logical addresses "0" to "5"), to two transmission priority setting circuits 101 corresponding to the logical addresses "5" and "6" each of which has a value generated by adding one to a value of each valid logical address equal to or more than the logical address "4" ("+1" shift). The logical address determining circuit portion 80 then registers a physical address (4), which is included in the REQ frame from the transmission station node 4, in the transmission priority setting circuit 101 corresponding to the logical address "4" (see FIG. 23(*d*)).

Namely, when the REQ frame (M=(4), V="2", T=transmission station node, JA="3"), which is transmitted from the transmission station node 4 (physical address (4)) and relayed by the transmission station hub 3 whose physical address (3) is registered in the transmission priority setting circuit 101 to which the logical address "2" is assigned, is input through the communication portion A, the logical address determining circuit portion 80 obtains a logical address "JA+1=4" generated by adding one to the logical address "JA=3". The logical address determining circuit portion 80 determines that the physical addresses (6) and (7) set in the transmission priority setting circuits 101 corresponding to the logical addresses "4" and "5" are physical addresses to be shifted. Then, the logical address determining circuit portion 80 respectively shifts the physical address (6) of transmission station hub 6 and the physical address (7) of transmission station node 7, which have been registered in two transmission priority setting circuits 101 corresponding to the logical addresses "4" and "5" equal to or more than the logical address "4" (within the valid logical addresses "0" to "5"), to two transmission priority setting circuits 101 corresponding to two logical addresses "5" and "6" each of which has a value generated by adding one to a value of each valid logical address equal to or more than the logical address "4". The logical address determining circuit portion 80 then registers the physical address (4) in the transmission priority setting circuit 101 corresponding to the logical address "4" (the address modification EN is set to "change", an address insertion, the address modification EN is set to "hold" after the physical address (4) is output, see FIG. 23(d)). At this time, a D-FF 901 having a logical address "6" in the live list LL (live list setting circuit portion 90) becomes valid (a value "1" is assigned), and the logical addresses "0" to "6" are valid in the live list LL. In the case where the master station manages the association between a physical address and a logical address on software, the address list AL has a state shown in FIG. 23(d).

(Node-Communication Port A-Connection Request Branching Station Node-Case 5: 7.7)

As shown in FIG. 23(e), a branching station node 12 transmits an REQ frame to the communication port A of the synchronous node and enters into the loop. The logical address determining circuit portion 80 determines the above-described condition FG ((1) to (5)). In a case where the determination result of condition FG is a case 5 (7.7: a transmission node is branching station node, an REQ frame is received in communication port A, and an adjacent relay node is transmission station hub) in FIG. 6A, the logical address determining circuit portion 80 respectively shifts the physical address (11) of branching station node 11, the physical address (4) of transmission station node 4, the physical address (6) of transmission station hub 6 and the physical address (7) of transmission station node 7, which have been registered in four transmission priority setting circuits 101 corresponding to the logical addresses "3", "4", "5" and "6" equal to or more than the logical address "3" determined according to the determination result of condition FG (within the valid logical addresses "0" to "6"), to four transmission priority setting circuits 101 corresponding to the logical addresses "4", "5", "6" and "7" each of which has a value generated by adding one to a value of each valid logical address equal to or more than the logical address "3" ("+1" shift). The logical address determining circuit portion 80 then registers a physical address (12), which is included in the REQ frame from the branching station node 12, in the transmission priority setting circuit 101 corresponding to the logical address "3" (see FIG. 23(b)).

Namely, when the REQ frame (M=(12), V="2", T=branching station node), which is transmitted from the branching station node 12 (physical address (12)) and relayed by the transmission station hub 3 whose physical address (3) is registered in the transmission priority setting circuit 101 to which the logical address "2" is assigned, is input through the communication portion A, the logical address determining circuit portion 80 obtains a logical address "V+1=3" generated by adding one to the logical address "V=2". The logical address determining circuit portion 80 determines that the physical addresses (11), (4), (6) and (7) set in the transmission priority setting circuits 101 corresponding to the logical address "3", "4", "5" and"6" are physical addresses to be shifted. Then, the logical address determining circuit portion 80 respectively shifts the physical address (11) of branching station node 11, the physical address (4) of transmission station node 4, the physical address (6) of transmission station hub 6 and the physical address (7) of transmission station node 7, which have been registered in four transmission priority setting circuits 101 corresponding to the logical addresses "3", "4", "5" and "6" equal to or more than the logical address "3" (within the valid logical addresses "0" to "6"), to four transmission priority setting circuits 101 corresponding to the logical addresses "4", "5", "6" and "7" each of which has a value generated by adding one to a value of each valid logical address equal to or more than the logical address "3". The logical address determining circuit portion 80 then registers the physical address (12) in the transmission priority setting circuit 101 corresponding to the logical address "3" (the address modification EN is set to "change", an address insertion, the address modification EN is set to "hold" after the physical address (12) is output, see FIG. 23(f)). At this time, a D-FF 901 having a logical address "7" in the live list LL (live list setting circuit portion 90) becomes valid (a value "1" is assigned), and the logical addresses "0" to "7" are valid in the live list LL. In the case where the master station manages the association between a physical address and a logical address on software, the address list AL has a state shown in FIG. 23(f).

(Node-Communication Port B-there is Hub Relay-Case 7: 7.8)

As shown in FIG. 24(a), a transmission station node 5 transmits an REQ frame to the communication port B of the synchronous node and enters into the loop between the transmission station node 4 and the transmission station hub 6. The logical address determining circuit portion 80 determines the above-described condition FG ((1) to (5)). In a case where the determination result of condition FG is a case 7 (7.8: a transmission node is transmission station node, an REQ frame is received in communication port B, and an adjacent relay node is transmission station hub) in FIG. 6A, the logical address determining circuit portion 80 respectively shifts the physical address (6) of transmission station hub 6 and the physical address (7) of transmission station node 7, which have been registered in two transmission priority setting circuits 101 corresponding to the logical addresses "6" and "7" equal to or more than the logical address "6" determined according to the determination result of condition FG (within the valid logical addresses "0" to "7"), to two transmission priority setting circuits 101 corresponding to the logical addresses "7" and "8" each of which has a value generated by adding one to a value of each valid logical address equal to or more than the logical address "6" ("+1" shift). The logical address determining circuit portion 80 then registers a physical address (5), which is included in the REQ frame from the transmission station node 5, in the transmission priority setting circuit 101 corresponding to the logical address "6" (see FIG. 24(b)).

Namely, when the REQ frame (M=(5), V="6"), which is transmitted from the transmission station node 5 (physical address (5)) and relayed by the transmission station hub 6 whose physical address (6) is registered in the transmission priority setting circuit 101 to which the logical address "6" is assigned, is input through the communication portion B, the logical address determining circuit portion 80 obtains a logical address "V=6". The logical address determining circuit portion 80 determines that the physical addresses (6) and (7) set in the transmission priority setting circuits 101 corresponding to the logical addresses "6" and "7" are physical addresses to be shifted. Then, the logical address determining circuit portion 80 respectively shifts the physical address (6) of transmission station hub 6 and the physical address (7) of transmission station node 7, which have been registered in two transmission priority setting circuits 101 corresponding to the logical addresses "6" and "7" equal to or more than the logical address "6" (within the valid logical addresses "0" to "7"), to two transmission priority setting circuits 101 corresponding to two logical addresses "7" and "8" each of which has a value generated by adding one to a value of each valid logical address equal to or more than the logical address "6". The logical address determining circuit portion 80 then registers the physical address (5) in the transmission priority setting circuit 101 corresponding to the logical address "6" (the address modification EN is set to "change", an address insertion, the address modification EN is set to "hold" after the physical address (5) is output, see FIG. 24(b)). At this time, a D-FF 901 having a logical address "8" in the live list LL (live list setting circuit portion 90) becomes valid (a value "1" is assigned), and the logical addresses "0" to "8" are valid in the live list LL. In the case where the master station manages the association between a physical address and a logical address on software, the address list AL has a state shown in FIG. 24(b).

(Node-Communication Port B-Connection Request Branching Station Node-Case 9: 7.9)

As shown in FIG. 24(c), a branching station node 13 transmits an REQ frame to the communication port B of the synchronous node and enters into the loop. The logical address determining circuit portion 80 determines the above-described condition FG ((1) to (5)). In a case where the determination result of condition FG is a case 9 (7.9: a transmission node is branching station node, an REQ frame is received in communication port B, and an adjacent relay node is transmission station hub) in FIG. 6A, the logical address determining circuit portion 80 shifts the physical address (7) of transmission station node 7, which has been registered in the transmission priority setting circuit 101 corresponding to the logical address "8" determined according to the determination result of condition FG, to a transmission priority setting circuit 101 corresponding to a logical address "9" generated by adding one to the logical address "8" ("+1" shift). The logical address determining circuit portion 80 then registers a physical address (13), which is included in the REQ frame from the branching station node 13, in the transmission priority setting circuit 101 corresponding to the logical address "8" (see FIG. 24(d)). Namely, when the REQ frame (M=(13), V="7", T=branching station node), which is transmitted from the branching station node 13 (physical address (13)) and relayed by the transmission station hub 6 whose physical address (6) is registered in the transmission priority setting circuit 101 to which the logical address "7" is assigned, is input through the communication portion B, the logical address determining circuit portion 80 obtains a logical address "V+1=8" generated by adding one to the logical address "V=7". The logical address determining circuit portion 80 determines that the physical address (7) set in the transmission priority setting circuits 101 corresponding to the logical address "8" is a physical address to be shifted. Then, the logical address determining circuit portion 80 shifts the physical address (7) of transmission station node 7, which has been registered in the transmission priority setting circuit 101 corresponding to the logical address "8", to the transmission priority setting circuit 101 corresponding to the logical address "9" generated by adding one to the logical address "8". The logical address determining circuit portion 80 then registers the physical address (13) in the transmission priority setting circuit 101 corresponding to the logical address "8" (the address modification EN is set to "change", an address insertion, the address modification EN is set to "hold" after the physical address (13) is output, see FIG. 24(d)). At this time, a D-FF 901 having a logical address "9" in the live list LL (live list setting circuit portion 90) becomes valid (a value "1" is assigned), and the logical addresses "0" to "9" are valid in the live list LL. In the case where the master station manages the association between a physical address and a logical address on software, the address list AL has a state shown in FIG. 24(d).

(Node-Communication Port B-Connection Request Branching Station Node-Case 9: 7.10)

As shown in FIG. 24(e), a branching station node 14 transmits an REQ frame to the communication port B of the synchronous node and enters into the loop. The logical address determining circuit portion 80 determines the above-described condition FG ((1) to (5)). In a case where the determination result of condition FG is a case 9 (7.10: a transmission node is branching station node, an REQ frame is received in communication port B, and an adjacent relay node is transmission station hub) in FIG. 6A, the logical address determining circuit portion 80 respectively shifts the physical address (13) of branching station node 13 and the physical address (7) of transmission station node 7 which have been registered in two transmission priority setting circuits 101 corresponding to the logical addresses "8" and "9" equal to or more than the logical address "8" determined according to the determination result of condition FG (within the valid logical addresses "0" to "9"), to two transmission priority setting circuits 101 corresponding to the logical addresses "9" and "10" each of which has a value generated by adding one to a value of each valid logical address equal to or more than the logical address "8" ("+1" shift). The logical address determining circuit portion 80 then registers a physical address (14), which is included in the REQ frame from the branching station node 14, in the transmission priority setting circuit 101 corresponding to the logical address "8" (see FIG. 24(f)).

Namely, when the REQ frame (M=(14), V="7", T=branching station node), which is transmitted from the branching station node 14 (physical address (14)) and relayed by the transmission station hub 6 whose physical address (6) is registered in the transmission priority setting circuit 101 to which the logical address "7" is assigned, is input through the communication portion B, the logical address determining circuit portion 80 obtains a logical address "V+1=8" generated by adding one to the logical address "V=7". The logical address determining circuit portion 80 determines that the physical addresses (13) and (7) set in the transmission priority setting circuits 101 corresponding to the logical address "8" and "9" are physical addresses to be shifted. Then, the logical address determining circuit portion 80 respectively shifts the physical address (13) of branching station node 13 and the physical address (7) of transmission station node 7, which have been registered in two transmission priority setting circuits 101 corresponding to the logical addresses "8" and "9" equal to or more than the logical address "8" (within the valid logical addresses "0" to "9"), to two transmission priority setting circuits 101 corresponding to the logical addresses "9" and "10" each of which has a value generated by adding one to a value of each valid logical address equal to or more than the logical address "8". The logical address determining circuit portion 80 then registers the physical address (14) in the transmission priority setting circuit 101 corresponding to the logical address "8" (the address modification EN is set to "change", an address insertion, the address modification EN is set to "hold" after the physical address (14) is output, see FIG. 24(f)). At this time, a D-FF 901 having a logical address "10" in the live list LL (live list setting circuit portion 90) becomes valid (a value "1" is assigned), and the logical addresses "0" to "10" are valid in the live list LL. In the case where the master station manages the association between a physical address and a logical address on software, the address list AL has a state shown in FIG. 24(f).

Figure 25:
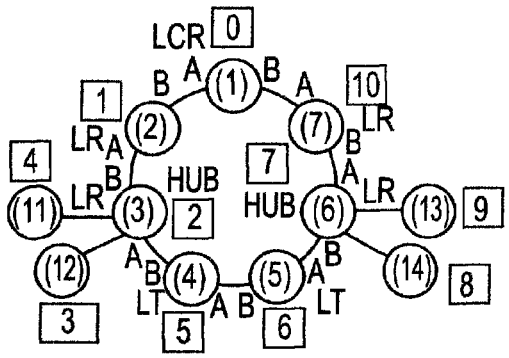
FIG. 25 is an explanatory diagram that illustrates an address list generated when a hub enters into the loop according to the second exemplary embodiment.

Finally, the live list LL and the address list AL have final states shown in FIG. 25. FIG. 25(a) shows a final connection topology. FIG. 25(b) shows the final state of live list LL. FIG. 25(c) shows the final state of address list AL.

(Example of Withdrawing from Loop)

Next, withdrawing from a loop will be described. With reference to FIG. 25(a), a case (deactivated case) where the transmission station hub (physical address (6)) withdraws from the loop will be described (see FIG. 26(a)). In this case, there is not a CMP frame from the transmission station hub (physical address (6)). At this time, the logical address "7" becomes empty in the address list.

When the transmission station hub (physical address (6)) withdraws from the loop, the physical address which is registered in the transmission priority setting circuit 101 to which the logical address "7" is assigned is cleared (there is not the transmission station hub (physical address (6))). Then, the logical address determining circuit portion 80 obtains logical addresses assigned to transmission priority setting circuits 101 which will newly register the physical addresses having been registered in the transmission priority setting circuits 101 to which the valid logical addresses equal to or more than the logical address "8" (="7"+1) are assigned, by carrying out the "logical address −1 shift".

In detail, the logical address determining circuit portion 80 obtains the logical addresses "7" (="8"−"1"), "8" (="9"−"1") and "9" (="10"−"1") because the logical addresses "8", "9" and "10" are valid, and then shifts the physical address (14), which has been registered in the transmission priority setting circuit 101 to which the logical address "8" is assigned, to the transmission priority setting circuit 101 to which the logical address "7" is assigned; shifts the physical address (13), which has been registered in the transmission priority setting circuit 101 to which the logical address "9" is assigned, to the transmission priority setting circuit 101 to which the logical address "8" is assigned; and shifts the physical address (7), which has been registered in the transmission priority setting circuit 101 to which the logical address "10" is assigned, to the transmission priority setting circuit 101 to which the logical address "9" is assigned (see FIG. 26(*b*)). Namely, the logical address determining circuit portion 80 subtracts one from each of values of valid logical addresses equal to or more than "8", and then sequentially shifts the physical addresses, which have been registered in the transmission priority setting circuits 101 to which the valid logical addresses equal to or more than the logical address "8" are assigned, to transmission priority setting circuits 101 to which the logical addresses obtained by the subtraction are assigned. In the case where the master station manages the association between a physical address and a logical address on software, the address list AL has a state shown in FIG. 26(*b*).

Next, a case (deactivated case) where the branching station node (physical address (14)) withdraws from the loop will be described (see FIG. 26(*c*)). In this case, there is not a CMP frame from the branching station node (physical address (14)). At this time, the logical address "7" becomes empty in the address list.

When the branching station node (physical address (14)) withdraws from the loop, the physical address which is registered in the transmission priority setting circuit 101 to which the logical address "7" is assigned is cleared (there is not the branching station node (physical address (14))). Then, the logical address determining circuit portion 80 obtains logical addresses assigned to transmission priority setting circuits 101 which will newly register the physical addresses having been registered in the transmission priority setting circuits 101 to which the valid logical addresses equal to or more than the logical address "8"(="7"+1) are assigned, by carrying out the "logical address −1 shift".

In detail, the logical address determining circuit portion 80 obtains the logical addresses "7" (="8"−"1") and "8" (="9"−"1") because the logical addresses "8" and "9" are valid, and then shifts the physical address (13), which has been registered in the transmission priority setting circuit 101 to which the logical address "8" is assigned, to the transmission priority setting circuit 101 to which the logical address "7" is assigned; and shifts the physical address (7), which has been registered in the transmission priority setting circuit 101 to which the logical address "9" is assigned, to the transmission priority setting circuit 101 to which the logical address "8" is assigned (see FIG. 26(*d*)). Namely, the logical address determining circuit portion 80 subtracts one from each of values of valid logical addresses equal to or more than logical address "8", and then sequentially shifts the physical addresses, which have been registered in the transmission priority setting circuits 101 to which the valid logical addresses equal to or more than the logical address "8" are assigned, to transmission priority setting circuits 101 to which the logical addresses obtained by the subtraction are assigned. In the case where the master station manages the association between a physical address and a logical address on software, the address list AL has a state shown in FIG. 26(*d*).

Next, a case (deactivated case) where the branching station node (physical address (13)) withdraws from the loop will be described (see FIG. 26(*e*)). In this case, there is not a CMP frame from the branching station node (physical address (13)). At this time, the logical address "7" becomes empty in the address list.

When the branching station node (physical address (13)) withdraws from the loop, the physical address which is registered in the transmission priority setting circuit 101 to which the logical address "7" is assigned is cleared (there is not the branching station node (physical address (13))). Then, the logical address determining circuit portion 80 obtains a logical address as signed to a transmission priority setting circuit 101 which will newly register the physical address having been registered in the transmission priority setting circuit 101 to which the logical address "8"(="7"+1) is assigned, by carrying out the "logical address −1 shift".

In detail, the logical address determining circuit portion 80 obtains the logical addresses "7"(="8"−"1") because the logical address "8" is valid, and then shifts the physical address (7), which has been registered in the transmission priority setting circuit 101 to which the logical address "8" is assigned, to the transmission priority setting circuit 101 to which the logical address "7" is assigned (see FIG. 26(*f*)). Namely, the logical address determining circuit portion 80 subtracts one from the logical address "8", and then shifts the physical address, which has been registered in the transmission priority setting circuit 101 to which the logical address "8" is assigned, to transmission priority setting circuit 101 to which the logical address obtained by the subtraction is assigned. In the case where the master station manages the association between a physical address and a logical address on software, the address list AL has a state shown in FIG. 26(*f*).

Accordingly, even if a transmission station hub enters into a loop, a transmission priority of the transmission station hub is determined according to a connection order. In a case where a branching station node is connected (star-like connected) to a transmission station hub, a transmission priority of the branching station node is determined, following a transmission priority of the transmission station hub. Namely, in a state where the transmission priority setting circuits 101 are sequentially arranged, a transmission priority of transmission stations is determined according to the arrangement sequence of transmission priority setting circuits 101 without depending on physical addresses M of the transmission stations, and then the determined transmission priority is set to each node. Thus, each transmission station can transmit a transmission frame based on its own transmission priority according to a reception of SYN frame, which reduces a transmission time.

For example, in a case where 256 transmission stations (including a master station) enter into a loop, the master station needs to perform 256 scans using SYN frames because the master station receives an REQ frame from only a node eligible to transmit a frame in MAC control time. In contrast, in the present embodiments, when a master station transmits an SYN frame, each node returns an REQ frame according to a connection order. This can reduce a transmission time (the master station does not need to perform 256 scans).

Other Exemplary Embodiment

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

According to a double-ring network system, a method for determining a transmission priority in a double-ring network, and a transmission station device of at least one embodiment described above, a transmission time is automatically reduced even if a transmission station is changed or added.

What is claimed is:

1. A double-ring network system comprising one or more transmission stations each of which is connected to a double-ring network and includes two communication ports allowing two-way communication, wherein:

any one of the one or more transmission stations functions as a master station;

a new transmission station, which enters into the double-ring network, transmits a connection request frame including a physical address of the new transmission station, according to a reception of a synchronous frame from the master station;

the master station associates the transmitted physical address with a logical address for determining a transmission priority of each transmission station connected to the double-ring network, to determine a transmission priority of the new transmission station;

the master station comprises:

a transmitting and receiving portion that controls a transmission and reception timing, transmits a generated frame from the two communication ports, and introduces therein a frame received via the double-ring network according to a transmission of a synchronous frame;

a frame detection determining circuit portion that determines whether or not the transmitting and receiving portion receives the connection request frame;

an address list setting circuit portion that includes transmission priority setting circuits to which logical addresses are sequentially assigned, and transmits a physical address of a transmission station set in each transmission priority setting circuit and a logical address of the each transmission priority setting circuit in which the physical address of the transmission station is set;

a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame;

the frame detection determining circuit portion includes an informing part that informs a reception via a communication port A when a connection request frame is received via one communication port of the two communication ports and informs a reception via a communication port B when a connection request frame is received via the other communication port of the two communication ports;

a physical address of a transmission station adjacent to the communication port B of the master station is set in a transmission priority setting circuit to which a logical address, whose a value is a maximum value among transmission priority setting circuits in which physical addresses of transmission stations are set, is assigned; and the logical address determining circuit portion includes:

a first determining part that determines, when a connection request frame relayed by at least one transmission station is received via the communication port A of the master station, whether or not there is a transmission station having entered by a reception of a connection request frame via the communication port B of the master station;

a first obtaining part that obtains, if there is a transmission station having entered by a reception of a connection request frame by the communication port B of the master station, a logical address corresponding to a transmission priority higher than a transmission priority corresponding to a logical address associated with a physical address of the transmission station having entered by the reception of the connection request frame via the communication port B, and lower than a transmission priority corresponding to a logical address associated with a physical address of the at least one transmission station having entered by a reception of a connection request frame via the communication port A;

a first setting part that sets a physical address included in the received connection request frame in a transmission priority setting circuit to which the logical address obtained by the first obtaining part is assigned;

a second determining part that determines, when a connection request frame relayed by at least one transmission station is received via the communication port B of the master station, whether or not there is a transmission station having entered by a reception of a connection request frame via the communication port A of the master station;

a second obtaining part that obtains, if there is a transmission station having entered by a reception of a connection request frame by the communication port A of the master station, a logical address corresponding to a transmission priority lower than a transmission priority corresponding to a logical address associated with a physical address of the transmission station having entered by the reception of the connection request frame via the communication port A, and higher than a transmission priority corresponding to a logical address associated with a physical address of the at least one transmission station having entered by a reception of a connection request frame via the communication port B; and a second setting part that sets a physical address included in the received connection request frame in a transmission priority setting circuit to which the logical address obtained by the second obtaining part is assigned.

2. A double-ring network system comprising one or more transmission stations each of which is connected to a double-ring network and includes two communication ports allowing two-way communication, wherein:

any one of the one or more transmission stations functions as a master station;

a new transmission station, which enters into the double-ring network, transmits a connection request frame including a physical address of the new transmission station, according to a reception of a synchronous frame from the master station;

the master station associates the transmitted physical address with a logical address for determining a transmission priority of each transmission station connected to the double-ring network, to determine a transmission priority of the new transmission station;

the master station comprises:

a transmitting and receiving portion that controls a transmission and reception timing, transmits a generated frame from the two communication ports, and introduces therein a frame received via the double-ring network according to a transmission of a synchronous frame;

a frame detection determining circuit portion that determines whether or not the transmitting and receiving portion receives the connection request frame;

an address list setting circuit portion that includes transmission priority setting circuits to which logical addresses are sequentially assigned, and transmits a physical address of a transmission station set in each transmission priority setting circuit and a logical address of the each transmission priority setting circuit in which the physical address of the transmission station is set;

a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame; and the logical address determining circuit portion includes:

a first setting part that sets, when a connection request frame relayed by at least one transmission station is received via one communication port A of the two communication ports, a physical address included in the connection request frame in a transmission priority setting circuit to which a logical address, which is generated by adding one to a logical address associated with a physical address of a transmission station that is adjacent to the new transmission station transmitting the connection request frame and relays the connection request frame, is assigned; and a second setting part that sets, when a connection request frame relayed by at least one transmission station is received via the other communication port B of the two communication ports, a physical address included in the connection request frame in a transmission priority setting circuit to which a logical address, which is associated with a physical address of a transmission station that is adjacent to the new transmission station transmitting the connection request frame and relays the connection request frame, is assigned.

3. A double-ring network system comprising one or more transmission stations each of which is connected to a double-ring network and includes two communication ports allowing two-way communication, wherein:

any one of the one or more transmission stations functions as a master station;

a new transmission station, which enters into the double-ring network, transmits a connection request frame including a physical address of the new transmission station, according to a reception of a synchronous frame from the master station;

the master station associates the transmitted physical address with a logical address for determining a transmission priority of each transmission station connected to the double-ring network, to determine a transmission priority of the new transmission station;

the master station comprises:

a transmitting and receiving portion that controls a transmission and reception timing, transmits a generated frame from the two communication ports, and introduces therein a frame received via the double-ring network according to a transmission of a synchronous frame;

a frame detection determining circuit portion that determines whether or not the transmitting and receiving portion receives the connection request frame;

an address list setting circuit portion that includes transmission priority setting circuits to which logical addresses are sequentially assigned, and transmits a physical address of a transmission station set in each transmission priority setting circuit and a logical address of the each transmission priority setting circuit in which the physical address of the transmission station is set;

a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame;

at least one transmission station is a hub station further including an independent communication port used to connect a branching station; and the logical address determining circuit portion includes:
  a first setting part that sets, when a connection request frame indicative of a connection of the branching station to the hub station is relayed by the hub station and received via one communication port A of the two communication ports, a physical address included in the connection request frame in a transmission priority setting circuit to which a logical address, which is generated by adding one to a logical address associated with a physical address of the hub station, is assigned; and
  a second setting part that sets, when a connection request frame indicative of a connection of a transmission station to the hub station to which the branching station is connected is relayed by the hub station and received via one communication port A of the two communication ports, a physical address included in the connection request frame in a transmission priority setting circuit to which a logical address, which is generated by adding one to a terminal logical address of the branching station connected to the hub station, is assigned.

4. A double-ring network system comprising one or more transmission stations each of which is connected to a double-ring network and includes two communication ports allowing two-way communication, wherein:

any one of the one or more transmission stations functions as a master station;

a new transmission station, which enters into the double-ring network, transmits a connection request frame including a physical address of the new transmission station, according to a reception of a synchronous frame from the master station;

the master station associates the transmitted physical address with a logical address for determining a transmission priority of each transmission station connected to the double-ring network, to determine a transmission priority of the new transmission station;

the master station comprises:
  a transmitting and receiving portion that controls a transmission and reception timing, transmits a generated frame from the two communication ports, and introduces therein a frame received via the double-ring network according to a transmission of a synchronous frame;
  a frame detection determining circuit portion that determines whether or not the transmitting and receiving portion receives the connection request frame;
  an address list setting circuit portion that includes transmission priority setting circuits to which logical addresses are sequentially assigned, and transmits a physical address of a transmission station set in each transmission priority setting circuit and a logical address of the each transmission priority setting circuit in which the physical address of the transmission station is set;

a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame; and when the master station does not receive a complete frame from a transmission station whose a physical address is included in the synchronous frame, the logical address determining circuit portion determines that the transmission station withdraws from the double-ring network, obtains logical addresses each of which is generated by subtracting one from each of logical addresses more than a logical address associated with a physical address of the withdrawing transmission station, and sequentially shifts physical addresses set in transmission priority setting circuits to which the logical addresses more than the logical address are assigned, to transmission priority setting circuits to which the obtained logical addresses are assigned.

5. A transmission station device which is connected to a double-ring network and includes two communication ports allowing two-way communication, the transmission station device comprising:

a transmitting and receiving portion that controls a transmission and reception timing, transmits a generated frame from the two communication ports, and introduces therein a frame received via the double-ring network according to a transmission of a synchronous frame;

a frame detection determining circuit portion that determines whether or not the transmitting and receiving portion receives a connection request frame from a new transmission station;

an address list setting circuit portion that includes transmission priority setting circuits to which logical addresses indicative of transmission priorities on the double-ring network are sequentially assigned, and transmits a physical address of a transmission station set in each transmission priority setting circuit and a logical address of the each transmission priority setting circuit in which the physical address of the transmission station is set;

a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame;

wherein:

the frame detection determining circuit portion includes an informing part that informs a reception via a communication port A when a connection request frame is received via one communication port of the two communication ports and informs a reception via a communication port B when a connection request frame is received via the other communication port of the two communication ports;

a physical address of a transmission station adjacent to a communication port B of the transmission station device functioning as a master station is set in a transmission priority setting circuit to which a logical address, whose a value is a maximum value among transmission priority setting circuits in which physical addresses of transmission stations are set, is assigned; and the logical address determining circuit portion includes:

a first determining part that determines, when a connection request frame relayed by at least one transmission station is received via the communication port A of the master station, whether or not there is a transmission station having entered by a reception of a connection request frame via the communication port B of the master station;

a first obtaining part that obtains, if there is a transmission station having entered by a reception of a connection request frame by the communication port B of the master station, a logical address corresponding to a transmission priority higher than a transmission priority corresponding to a logical address associated with a physical address of the transmission station having entered by the reception of the connection request frame via the communication port B, and lower than a transmission priority corresponding to a logical address associated with a physical address of the at least one transmission station having entered by a reception of a connection request frame via the communication port A;

a first setting part that sets a physical address included in the received connection request frame in a transmission priority setting circuit to which the logical address obtained by the first obtaining part is assigned;

a second determining part that determines, when a connection request frame relayed by at least one transmission station is received via the communication port B of the master station, whether or not there is a transmission station having entered by a reception of a connection request frame via the communication port A of the master station;

a second obtaining part that obtains, if there is a transmission station having entered by a reception of a connection request frame by the communication port A of the master station, a logical address corresponding to a transmission priority lower than a transmission priority corresponding to a logical address associated with a physical address of the transmission station having entered by the reception of the connection request frame via the communication port A, and higher than a transmission priority corresponding to a logical address associated with a physical address of the at least one transmission station having entered by a reception of a connection request frame via the communication port B; and a second setting part that sets a physical address included in the received connection request frame in a transmission priority setting circuit to which the logical address obtained by the second obtaining part is assigned.

6. A transmission station device which is connected to a double-ring network and includes two communication ports allowing two-way communication, the transmission station device comprising:

a transmitting and receiving portion that controls a transmission and reception timing, transmits a generated frame from the two communication ports, and introduces therein a frame received via the double-ring network according to a transmission of a synchronous frame;

a frame detection determining circuit portion that determines whether or not the transmitting and receiving portion receives a connection request frame from a new transmission station;

an address list setting circuit portion that includes transmission priority setting circuits to which logical addresses indicative of transmission priorities on the double-ring network are sequentially assigned, and transmits a physical address of a transmission station set in each transmission priority setting circuit and a logical address of the each transmission priority setting circuit in which the physical address of the transmission station is set;

a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and a frame data generating circuit portion that generates a synchronous frame to which a physical address and a logical address from the address list setting circuit are added, and instructs the transmitting and receiving portion to transmit the generated synchronous frame;

wherein the logical address determining circuit portion includes:

a first setting part that sets, when a connection request frame relayed by at least one transmission station is received via one communication port A of the two communication ports, a physical address included in the connection request frame in a transmission priority setting circuit to which a logical address, which is generated by adding one to a logical address associated with a physical address of a transmission station that is adjacent to the new transmission station transmitting the connection request frame and relays the connection request frame, is assigned; and a second setting part that sets, when a connection request frame relayed by at least one transmission station is received via the other communication port B of the two communication ports, a physical address included in the connection request frame in a transmission priority setting circuit to which a logical address, which is associated with a physical address of a transmission station that is adjacent to the new transmission station transmitting the connection request frame and relays the connection request frame, is assigned.

7. A transmission station device which is connected to a double-ring network and includes two communication ports allowing two-way communication, the transmission station device comprising:
- a transmitting and receiving portion that controls a transmission and reception timing, transmits a generated frame from the two communication ports, and introduces therein a frame received via the double-ring network according to a transmission of a synchronous frame;
- a frame detection determining circuit portion that determines whether or not the transmitting and receiving portion receives a connection request frame from a new transmission station;
- an address list setting circuit portion that includes transmission priority setting circuits to which logical addresses indicative of transmission priorities on the double-ring network are sequentially assigned, and transmits a physical address of a transmission station set in each transmission priority setting circuit and a logical address of the each transmission priority setting circuit in which the physical address of the transmission station is set;
- a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and
- a frame data generating circuit portion that generates a synchronous frame to which a physical address and a logical address from the address list setting circuit are added, and instructs the transmitting and receiving portion to transmit the generated synchronous frame;
- wherein at least one transmission station is a hub station further including an independent communication port used to connect a branching station; and
- wherein the logical address determining circuit portion includes:
  - a first setting part that sets, when a connection request frame indicative of a connection of the branching station to the hub station is relayed by the hub station and received via one communication port A of the two communication ports, a physical address included in the connection request frame in a transmission priority setting circuit to which a logical address, which is generated by adding one to a logical address associated with a physical address of the hub station, is assigned; and
  - a second setting part that sets, when a connection request frame indicative of a connection of a transmission station to the hub station to which the branching station is connected is relayed by the hub station and received via one communication port A of the two communication ports, a physical address included in the connection request frame in a transmission priority setting circuit to which a logical address, which is generated by adding one to a terminal logical address of the branching station connected to the hub station, is assigned.

8. A transmission station device which is connected to a double-ring network and includes two communication ports allowing two-way communication, the transmission station device comprising:
- a transmitting and receiving portion that controls a transmission and reception timing, transmits a generated frame from the two communication ports, and introduces therein a frame received via the double-ring network according to a transmission of a synchronous frame;
- a frame detection determining circuit portion that determines whether or not the transmitting and receiving portion receives a connection request frame from a new transmission station;
- an address list setting circuit portion that includes transmission priority setting circuits to which logical addresses indicative of transmission priorities on the double-ring network are sequentially assigned, and transmits a physical address of a transmission station set in each transmission priority setting circuit and a logical address of the each transmission priority setting circuit in which the physical address of the transmission station is set;
- a logical address determining circuit portion that determines, when the frame detection determining circuit portion receives the connection request frame, a logical address whose a value corresponds to a connection number of the new transmission station such that transmission priorities of transmission stations match a connection order on the double-ring network, and sets the physical address included in the connection request frame in a transmission priority setting circuit to which the determined logical address is assigned; and
- a frame data generating circuit portion that generates a synchronous frame to which a physical address and a logical address from the address list setting circuit are added, and instructs the transmitting and receiving portion to transmit the generated synchronous frame;
- wherein when the transmission station device does not receive a complete frame from a transmission station whose a physical address is included in the synchronous frame, the logical address determining circuit portion determines that the transmission station withdraws from the double-ring network, obtains logical addresses each of which is generated by subtracting one from each of logical addresses more than a logical address associated with a physical address of the withdrawing transmission station, and sequentially shifts physical addresses set in transmission priority setting circuits to which the logical addresses more than the logical address are assigned, to transmission priority setting circuits to which the obtained logical addresses are assigned.

* * * * *